(12) United States Patent
Nakayama

(10) Patent No.: US 12,465,209 B2
(45) Date of Patent: Nov. 11, 2025

(54) OPHTHALMIC OPTICAL SYSTEM AND OPHTHALMIC DEVICE

(71) Applicant: NIKON CORPORATION, Tokyo (JP)

(72) Inventor: Hiroaki Nakayama, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 505 days.

(21) Appl. No.: 17/704,816

(22) Filed: Mar. 25, 2022

(65) Prior Publication Data
US 2022/0211265 A1    Jul. 7, 2022

Related U.S. Application Data

(63) Continuation of application No. PCT/JP2020/035560, filed on Sep. 18, 2020.

(30) Foreign Application Priority Data

Sep. 25, 2019    (JP) ................ 2019-174572

(51) Int. Cl.
*A61B 3/10*     (2006.01)
*A61B 3/14*     (2006.01)
*G02B 26/10*   (2006.01)
*A61B 5/00*    (2006.01)

(52) U.S. Cl.
CPC ............ *A61B 3/102* (2013.01); *A61B 3/1025* (2013.01); *A61B 3/14* (2013.01); *G02B 26/105* (2013.01); *A61B 5/0066* (2013.01)

(58) Field of Classification Search
CPC ......... A61B 3/102; A61B 3/1025; A61B 3/14; A61B 5/0066; G02B 26/105; G02B 21/06; G02B 21/18; G02B 13/18; G02B 21/00; G02B 21/0008; G02B 21/002; G02B 21/02

USPC .......................................................... 351/206
See application file for complete search history.

(56) References Cited

U.S. PATENT DOCUMENTS

| 4,704,018 A | 11/1987 | Takhashi |
| 6,409,341 B1 | 6/2002 | Goldfain et al. |
| 2002/0080498 A1* | 6/2002 | Takahashi .............. G02B 13/24 359/648 |

(Continued)

FOREIGN PATENT DOCUMENTS

| CN | 217181323 U | * | 8/2022 |
| CN | 115047592 A | * | 9/2022 |

(Continued)

OTHER PUBLICATIONS

Office Action issued in corresponding Japanese Patent Application No. 2021-548890 issued on Nov. 28, 2023 (5 pages).

(Continued)

*Primary Examiner* — Mohammed A Hasan
(74) *Attorney, Agent, or Firm* — Foley & Lardner LLP

(57) ABSTRACT

An ophthalmic optical system for observing an subject eye, including: an objective optical system that forms a pupil that has a conjugate relationship with a pupil of the subject eye, wherein, given that a distance from a pupil position that has a conjugate relationship with the pupil of the subject eye to the pupil of the subject eye is L, and a sum of central thicknesses of lenses included in the objective optical system is D, a conditional expression expressed by $$0.1 \leq D/L \leq 0.25$$

is satisfied.

13 Claims, 13 Drawing Sheets

(56) References Cited

U.S. PATENT DOCUMENTS

| | | | |
|---|---|---|---|
| 2003/0103191 A1* | 6/2003 | Staurenghi | A61B 3/125 351/219 |
| 2009/0257065 A1 | 10/2009 | Hauger et al. | |
| 2016/0150953 A1 | 6/2016 | Sasaki et al. | |
| 2019/0038132 A1 | 2/2019 | Lai | |
| 2019/0261853 A1* | 8/2019 | Williamson | A61B 3/14 |
| 2021/0093194 A1* | 4/2021 | Muyo | A61B 3/14 |

FOREIGN PATENT DOCUMENTS

| | | | |
|---|---|---|---|
| CN | 116088143 A * | 5/2023 | |
| JP | S61-085921 | 5/1986 | |
| JP | 2009-230141 | 10/2009 | |
| WO | WO-2018/043657 A1 | 3/2018 | |
| WO | WO-2018/198840 A1 | 11/2018 | |

OTHER PUBLICATIONS

Office Action issued in corresponding Japanese Patent Application No. 2021-548890 dated May 16, 2023 (6 pages).
JP Notice of Reasons for Refusal issued in corresponding Japanese Application No. 2024-029023 Dated Feb. 12, 2025 (8 pages).

\* cited by examiner

OPHTHALMIC OPTICAL SYSTEM AND OPHTHALMIC DEVICE

CROSS-REFERENCE TO RELATED APPLICATION

This application is a continuation application of International Application No. PCT/JP2020/035560, filed Sep. 18, 2020, the disclosure of which is incorporated herein by reference in its entirety. Further, this application claims priority from Japanese Patent Application No. 2019-174572, filed Sep. 25, 2019, the disclosure of which is incorporated herein by reference in its entirety.

TECHNICAL FIELD

The present invention relates to an ophthalmic optical system and an ophthalmic device.

BACKGROUND ART

U.S. Patent Application Publication No. 2016/0150953 discloses a device that images an subject eye by using a scanning-type laser ophthalmoscope and optical coherence tomography.

SUMMARY

A first aspect of the technique of the present disclosure is an ophthalmic optical system for observing an subject eye, including:
an objective optical system that forms a pupil that has a conjugate relationship with a pupil of the subject eye, wherein, given that a distance from a pupil position that has a conjugate relationship with the pupil of the subject eye to the pupil of the subject eye is L, and a sum of central thicknesses of lenses included in the objective optical system is D, a conditional expression expressed by $0.1 \leq D/L \leq 0.25$ is satisfied.

A second aspect of the technique of the present disclosure is an ophthalmic device including:
a scanning section that scans light from a light source; and
an objective optical system having lens groups that form a pupil, which has a conjugate relationship with a pupil of an subject eye, at the scanning section,
wherein, given that a distance from the scanning section to the pupil of the subject eye is L, and a sum of central thicknesses of the lens groups is D, the objective optical system satisfies a conditional expression expressed by $0.1 \leq D/L \leq 0.25$.

Note that the pupil of the subject eye means the position at which the pupil of the subject eye is disposed so as to coincide with the device, i.e., "the position corresponding to the pupil position of the subject eye" with respect to the device, at the time when the device scans/images the subject eye, and, it goes without saying that the subject eye is not included as a portion of the device. In the following description, there are cases in which this position is called the "pupil position of the subject eye" or simply the "pupil of the subject eye".

DESCRIPTION OF EMBODIMENTS

Embodiments of the present invention are described in detail hereinafter with reference to the drawings.

First Embodiment

An ophthalmic device 110 relating to a first embodiment of the present invention is described hereinafter with reference to the drawings.

Figure 1:
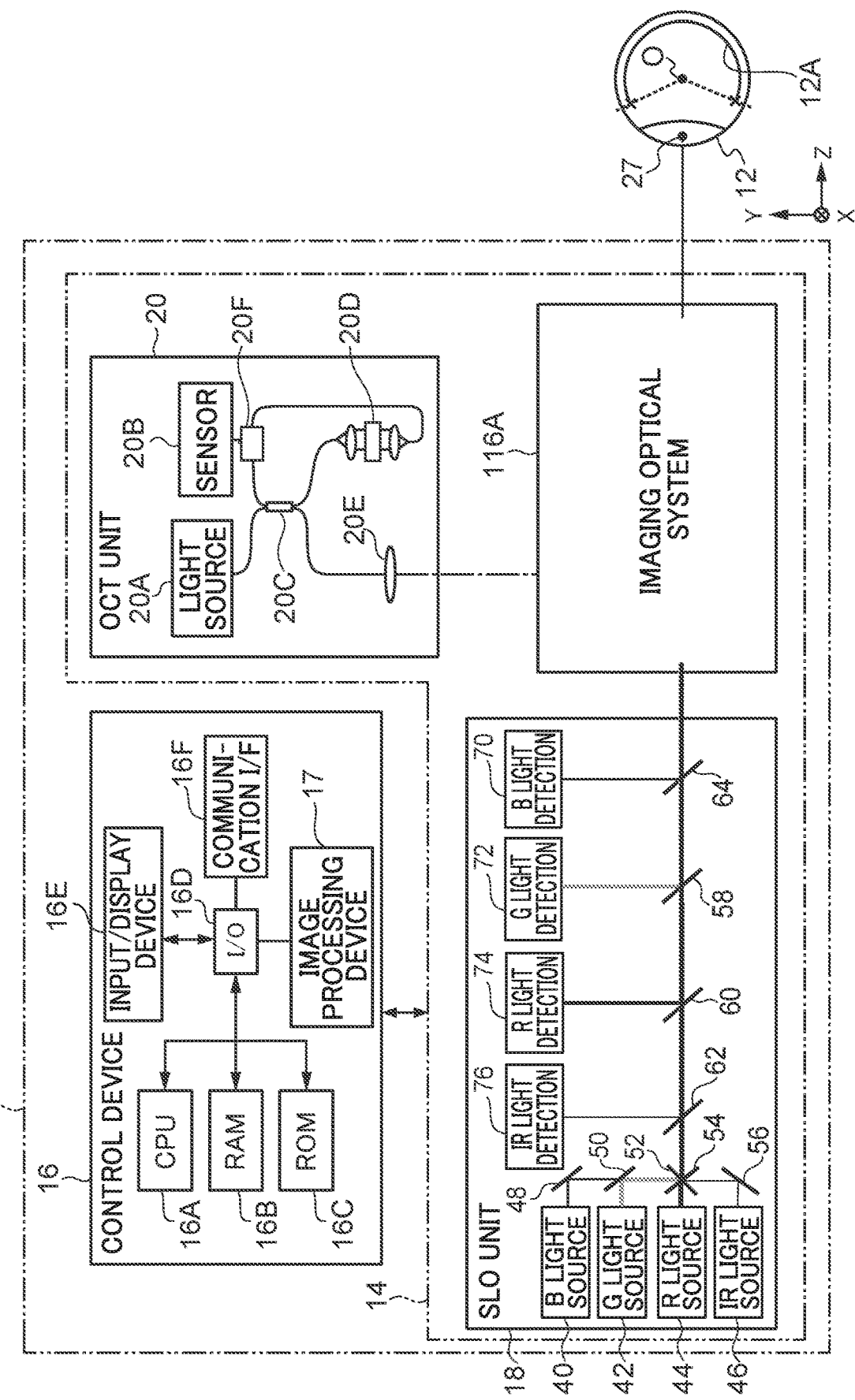
FIG. 1 is a schematic structural drawing of an ophthalmic device of a first embodiment.

The schematic structure of the ophthalmic device 110 is illustrated in FIG. 1.

For convenience of explanation, a scanning laser ophthalmoscope is called "SLO". Further, optical coherence tomography is called "OCT".

Note that the horizontal direction, in a case in which the ophthalmic device 110 is set on a horizontal surface, is the "X direction", the direction orthogonal to the horizontal surface is the "Y direction", and the optical axis direction of an imaging optical system 116A is the "Z direction". The device is placed, with respect to an subject eye 12, such that pupil center 27 of the subject eye is positioned on the optical axis that is the Z direction. Further, the X direction, the Y direction and the Z direction are orthogonal to one another.

The ophthalmic device 110 includes an imaging device 14 and a control device 16. The imaging device 14 has a SLO unit 18 that acquires an image of fundus 12A of the subject eye 12, and an OCT unit 20 that acquires a tomographic image of the subject eye 12. Hereinafter, the fundus image that is generated on the basis of the SLO data acquired by the SLO unit 18 is called a SLO image. Further, the tomographic image that is generated on the basis of the OCT data acquired by the OCT unit 20 is called an OCT image. Note that the SLO image is also referred to as a two-dimensional fundus image. Further, the OCT image is also referred to as a fundus tomographic image and an anterior eye portion tomographic image, in accordance with the imaged region of the subject eye 12.

The ophthalmic device 110 is an example of the "ophthalmic device" of the technique of the present disclosure.

The control device 16 has a computer having a CPU (Central Processing Unit) 16A, a RAM (Random Access Memory) 16B, a ROM (Read Only Memory) 16C, and an input/output port (I/O) 16D.

The control device 16 has an input/display device 16E that is connected to the CPU 16A via the I/O port 16D. The input/display device 16E has a graphic user interface that displays the image of the subject eye 12 and receives various instructions from the user. A touch panel display can be used as the input/display device 16E. The control device 16 also has a communication I/F 16F that is connected to the I/O port 16D.

Further, the control device 16 has an image processing device 17 that is connected to the I/O port 16D. The image processing device 17 generates an image of the subject eye 12 on the basis of data obtained by the imaging device 14.

As described above, in FIG. 1, the control device 16 of the ophthalmic device 110 has the input/display device 16E, but the technique of the present disclosure is not limited to this. For example, the control device 16 of the ophthalmic device 110 may not have the input/display device 16E, and may have a separate input/display device that is physically independent of the ophthalmic device 110. In this case, the display device has an image processing processor unit that operates under the control of the CPU 16A of the control device 16. The image processing processor unit may display the SLO image and the like on the basis of image signals that are outputted and instructed from the CPU 16A.

The imaging device 14 operates under the control of the control device 16. The imaging device 14 includes the SLO unit 18, the imaging optical system 116A and the OCT unit 20. The imaging optical system 116A is moved in the X, Y, Z directions by an imaging optical system driving section (not illustrated), under the control of the CPU 16A. The aligning (positioning) of the imaging device 14 and the subject eye 12 may be carried out, for example, by moving not merely the imaging device 14, but the entire ophthalmic device 110 in the X, Y, Z directions.

A SLO system is realized by the control device 16, the SLO unit 18 and the imaging optical system 116A that are illustrated in FIG. 1.

The SLO unit 18 has plural light sources. For example, as illustrated in FIG. 1, the SLO unit 18 has a light source 40 of B light (blue color light), a light source 42 of G light (green color light), a light source 44 of R light (red color light), and a light source 46 of IR light (infrared light (e.g., near infrared light)). The lights that exit from the respective light sources 40, 42, 44, 46 are directed toward the same optical path via respective optical members 48, 50, 52, 54, 56. The optical members 48, 56 are mirrors, and the optical members 50, 52, 54 are beam splitters. The B light is guided via the optical members 48, 50, 54 to the optical path of the imaging optical system 116A. The G light is guided via the optical members 50, 54 to the optical path of the imaging optical system 116A. The R light is guided via the optical members 52, 54 to the optical path of the imaging optical system 116A. The IR light is guided via the optical members 56, 52 to the optical path of the imaging optical system 116A. Note that LED light sources or laser light sources can be used as the light sources 40, 42, 44, 46. Note that an example using laser light sources is described hereinafter. Total reflection mirrors can be used as the optical members 48, 56. Further, dichroic mirrors, half mirrors or the like can be used as the optical members 50, 52, 54.

The light sources 40, 42, 44, 46 are examples of the "light source" of the technique of the present disclosure.

The SLO unit 18 is structured so as to be able to be switched between various light-emitting modes such as a light-emitting mode in which G light, R light, B light and IR light are respectively emitted independently, a light-emitting mode in which these lights are all emitted simultaneously or some thereof are emitted simultaneously, and the like. In the example illustrated in FIG. 1, the four light sources that are the light source 40 of B light (blue color light), the light source 42 of G light, the light source 44 of R light, and the light source 46 of IR light are provided, but the technique of the present disclosure is not limited to this. For example, the SLO unit 18 may further have a light source of white light. In this case, in addition to the above-described various light-emitting modes, a light-emitting mode in which only white light is emitted, or the like, may be set.

The laser light that is incident on the imaging optical system 116A from the SLO unit 18 is scanned in the X direction and the Y direction by scanning sections (120, 142) that are described later in FIG. 2. The scanning light is illuminated, via the pupil 27, onto the posterior eye portion (e.g., the fundus 12A) of the subject eye 12. The reflected light that is reflected by the fundus 12A is incident, via the imaging optical system 116A, onto the SLO unit 18.

The scanning sections (120, 142) are examples of the "scanning sections" of the technique of the present disclosure.

The reflected light that is reflected at the fundus 12A is detected by light detecting elements 70, 72, 74, 76 that are provided at the SLO unit 18. In the present embodiment, the SLO unit 18 has the B light detecting element 70, the G light detecting element 72, the R light detecting element 74 and the IR light detecting element 76, in correspondence with the plural light sources, i.e., the B light source 40, the G light source 42, the R light source 44 and the IR light source 46. The B light detecting element 70 detects the B light that is reflected at the beam splitter 64. The G light detecting element 72 detects the G light that is transmitted through the beam splitter 64 and reflected at the beam splitter 58. The R light detecting element 74 detects the R light that is transmitted through the beam splitters 64, 58 and is reflected at the beam splitter 60. The IR light detecting element 76 detects the G light that is transmitted through the beam splitters 64, 58, 60 and is reflected at the beam splitter 62. APDs (avalanche photodiodes) are examples of the light detecting elements 70, 72, 74, 76.

Under the control of the CPU 16A, the image processing device 17 generates SLO images corresponding to the respective colors, by using the signals detected by the B light detecting element 70, the G light detecting element 72, the R light detecting element 74 and the IR light detecting element 76, respectively. The SLO images corresponding to the respective colors are a B-SLO image generated by using the signals detected by the B light detecting element 70, a G-SLO image generated by using the signals detected by the G light detecting element 72, an R-SLO image generated by using the signals detected by the R light detecting element 74, and an IR-SLO image generated by using the signals detected by the IR light detecting element 76. Further, in the case of the light-emitting mode in which the B light source 40, the G light source 42 and the R light source 44 emit light simultaneously, an RGB-SLO image may be synthesized from the B-SLO image, the G-SLO image and the R-SLO image that are generated by using the respective signals detected by the R light detecting element 74, the G light detecting element 72 and the B light detecting element 70. Further, in the case of the light-emitting mode in which the G light source 42 and the R light source 44 emit light simultaneously, an RG-SLO image may be synthesized from the G-SLO image and the R-SLO image that are generated by using the respective signals detected by the R light detecting element 74 and the G light detecting element 72. Although an RG-SLO image is used as the SLO image in the first embodiment, the technique of the present disclosure is not limited to this, and another SLO image can be used.

Dichroic mirrors, half mirrors or the like can be used for the beam splitters 58, 60, 62, 64.

The OCT system is a three-dimensional image acquiring device that is realized by the control device 16, the OCT unit 20 and the imaging optical system 116A that are illustrated in FIG. 1. The OCT unit 20 includes a light source 20A, a sensor (detecting element) 20B, a first optical coupler 20C, a reference optical system 20D, a collimator lens 20E and a second optical coupler 20F.

The light source 20A emits light for optical coherence tomography. For example, a super luminescent diode (SLD) can be used as the light source 20A. The light source 20A generates low interference light of a broadband light source that has a wide spectral width. The light that exits from the light source 20A is split at the first optical coupler 20C. One divisional light is made into parallel light at the collimator lens 20E as measurement light, and thereafter, is made incident on the imaging optical system 116A. The measurement light is scanned in the X direction and the Y direction by scanning sections (148, 142) that are described later. The scanning light is illuminated onto the anterior eye portion of the subject eye, or onto the posterior eye portion via the pupil 27. The measurement light that is reflected by the anterior eye portion or the posterior eye portion goes through the imaging optical system 116A and is made incident on the OCT unit 20, and, via the collimator lens 20E and the first optical coupler 20C, is incident on the second optical coupler 20F. Note that, in the present embodiment, an SD-OCT using an SLD is given as an example of the light source 20A, but the technique of the present disclosure is not limited to this, and an SS-OCT that uses a wavelength sweeping light source may be employed instead of an SLD.

The other light, which exits from the light source 20A and is branched-off at the first optical coupler 20C, is incident on the reference optical system 20D as reference light, and goes through the reference optical system 20D and is incident on the second optical coupler 20F.

The measurement light (returned light) that is reflected and scattered at the subject eye 12, and the reference light, are combined at the second optical coupler 20F, and interference light is generated. The interference light is detected at the sensor 20B. On the basis of a detection signal (OCT data) from the sensor 20B, the image processing device 17 generates a tomographic image of the subject eye 12.

In the first embodiment, the OCT system generates a tomographic image of the anterior eye portion or the posterior eye portion of the subject eye 12.

The anterior eye portion of the subject eye 12 is the portion that includes, for example, the cornea, the iris, the corner angle, the lens, the ciliary body and a portion of the vitreous body, as the anterior eye segment. The posterior eye portion of the subject eye 12 is the portion that includes, for example, the remaining portion of the vitreous body, the retina, the choroid and the sclera, as the posterior eye segment. Note that the vitreous body that belongs to the anterior eye portion is the portion of the vitreous body that is at the cornea side, with the border being the X-Y plane that passes through the point of the lens that is nearest to the center of the eyeball. The vitreous body that belongs to the posterior eye portion is the portion of the vitreous body that is other than the vitreous body belonging to the anterior eye portion.

In a case in which the anterior eye portion of the subject eye 12 is the region that is the object of imaging, the OCT system generates a tomographic image of the cornea for example. Further, in a case in which the posterior eye portion of the subject eye 12 is the region that is the object of imaging, the OCT system generates a tomographic image of the retina for example.

Figure 2:
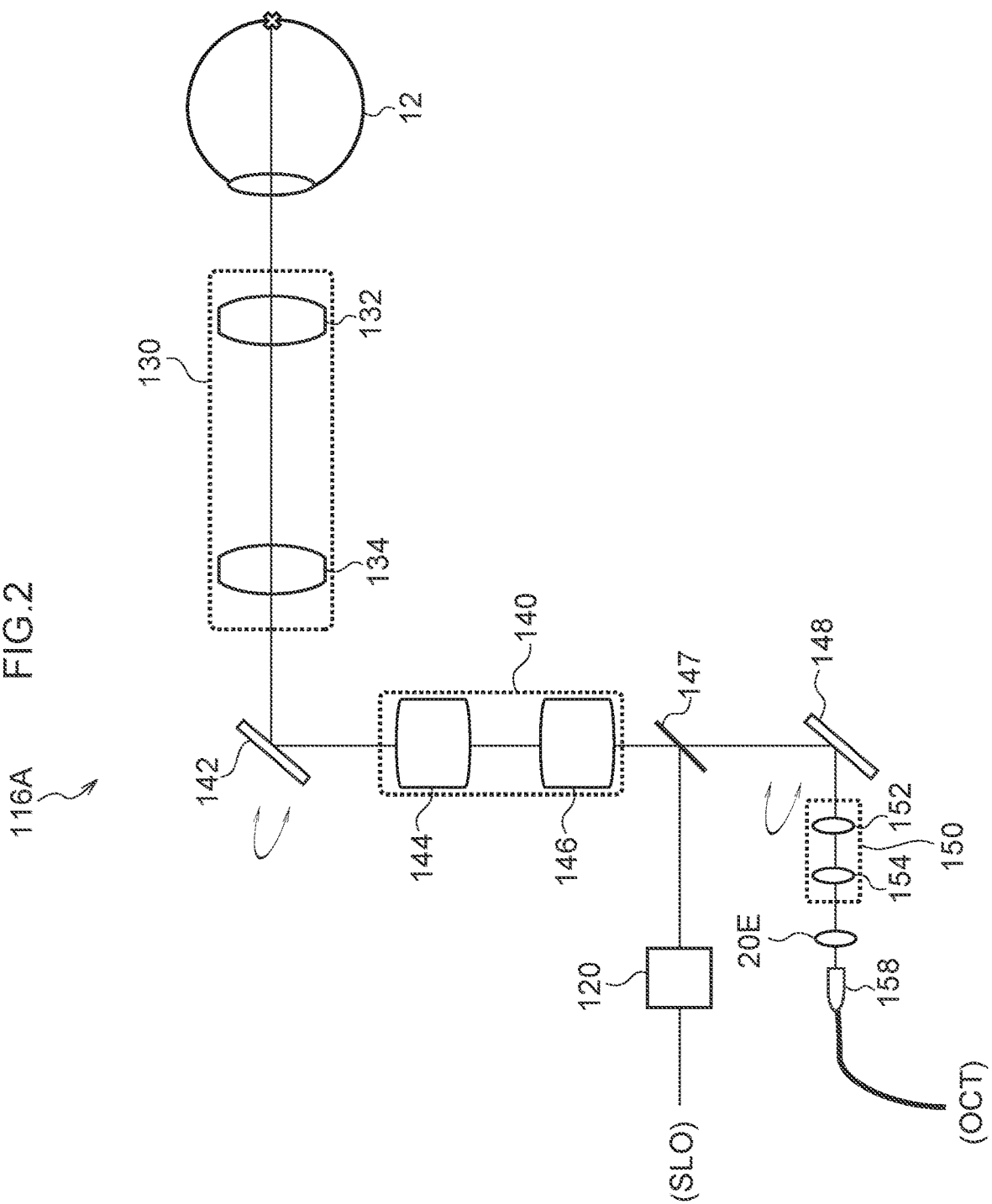
FIG. 2 is a schematic structural drawing of an imaging optical system of the first embodiment.

The schematic structure of the imaging optical system 116A is illustrated in FIG. 2. The imaging optical system 116A has an objective lens 130, the horizontal scanning section 142, a relay lens device 140, a beam splitter 147, the vertical scanning sections 120, 148, a focus adjusting device 150 and the collimator lens 20E that are disposed in that order from the subject eye 12 side.

For example, dichroic mirrors, half mirrors or the like can be used as beam splitters 178, 147.

The horizontal scanning section 142 is an optical scanner that scans, in the horizontal direction, the laser light of SLO and the measurement light of OCT that are incident via the relay lens device 140. In the present embodiment, the horizontal scanning section 142 is shared by the SLO optical system and the OCT optical system, but the technique of the present disclosure is not limited to this. A horizontal scanning section may be provided for each of the SLO optical system and the OCT optical system.

The collimator lens 20E makes, into parallel light, the measurement light that exits from end portion 158 of a fiber through which the light exiting from the OCT unit 20 advances.

The focus adjusting device 150 has plural lenses 152, 154. The focus adjusting device 150 adjusts the focus position of the measurement light at the subject eye 12 by moving the plural lenses 152, 154 respectively in the optical axis direction appropriately in accordance with the region to be imaged at the subject eye 12. Note that, although not illustrated, in a case in which a focus detecting device is provided, an autofocus device can be realized by driving the lenses 152, 154 by the focus adjusting device in accordance with the state of focal point detection, and carrying out focusing automatically.

The vertical scanning section 148 is an optical scanner that scans, in the vertical direction, the measurement light that is incident thereon via the focus adjusting device 150.

The vertical scanning section 120 is an optical scanner that scans, in the vertical direction, the laser light that is incident thereon from the SLO unit 18.

The relay lens device 140 has plural lenses 144, 146 that have positive power. The relay lens device 140 is structured by the plural lenses 144, 146 such that the positions of the vertical scanning sections 148, 120 and the position of the horizontal scanning section 142 are conjugate. More specifically, the relay lens device 140 is structured such that the central positions of the angular scanning of the both scanning sections are conjugate.

The beam splitter 147 is disposed between the relay lens device 140 and the vertical scanning section 148. The beam splitter 147 is an optical member that combines the SLO optical system and the OCT optical system, and reflects the SLO light, which exits from the SLO unit 18, toward the relay lens device 140, and transmits the measurement light, which exits from the OCT unit 20, toward the relay lens device 140. The measurement light that exits from the OCT unit 20 is two-dimensionally scanned by the vertical scanning section 148 and the horizontal scanning section 142. Further, the light that exits from the SLO unit 18 is two-dimensionally scanned by the vertical scanning section 120 and the horizontal scanning section 142 that structure the SLO optical system. The OCT measurement light and the SLO laser light that are scanned two-dimensionally are respectively made incident onto the subject eye 12 via the objective lens 130 that structures a shared optical system. The SLO laser light that is reflected at the subject eye 12 goes through the objective lens 130, the horizontal scanning section 142, the relay lens device 140, the beam splitter 147 and the vertical scanning section 120, and is made incident on the SLO unit 18. Further, the OCT measurement light that has gone through the subject eye 12 goes through the objective lens 130, the horizontal scanning section 142, the relay lens device 140, the beam splitter 147, the vertical scanning section 148, the focus adjusting device 150 and the collimator lens 20E, and is made incident on the OCT unit 20.

For example, resonant scanners, galvano mirrors, polygon mirrors, rotating mirrors, dove prisms, double dove prisms, rotation prisms, MEMS mirror scanners, acousto-optic elements (AOMs) and the like are suitably used as the horizontal scanning section 142 and the vertical scanning sections 120, 148. In the present embodiment, a galvano mirror is used as the vertical scanning section 148, and further, a polygon mirror is used as the vertical scanning section 120. Note that, in a case in which a two-dimensional optical scanner such as a MEMS mirror scanner or the like is used instead of an optical scanner such as a polygon mirror or a galvano mirror or the like, the incident light can be angle-scanned two-dimensionally by that reflecting element, and therefore, the relay lens device 140 may be eliminated.

The objective lens 130 has, in order from the horizontal scanning section 142 side, a first lens group 134 and a second lens group 132. At least the second lens group 132 is, overall, a positive lens group having positive power. In the first embodiment, the first lens group 134 as well is, overall, a positive lens group having positive power. Each of the first lens group 134 and the second lens group 132 has at least one positive lens. In a case in which each of the first lens group 134 and the second lens group 132 has plural lenses, the first lens group 134 and the second lens group 132 may include a negative lens, provided that each of the first lens group 134 and the second lens group 132 has positive power overall.

The first lens group 134 is an example of the "first lens group" of the technique of the present disclosure, and the second lens group 132 is an example of the "second lens group" of the technique of the present disclosure.

The first lens group 134 and the second lens group 132 that structure the objective lens 130 are separated by the longest air gap on optical axis AX between lens surfaces at the objective lens 130. Note that, even if there is a glass plate that does not have power at a position between the first lens group 134 and the second lens group 132, the glass plate is not considered to be a lens that belongs to either the first lens group 134 or the second lens group 132, and it is considered that the first lens group 134 and the second lens group 132 are separated by the longest air gap. This longest air gap is convenient for providing a combining section that has light combining and light dividing functions such as a dichroic mirror or the like.

Note that, with regard to the first lens group 134 and the second lens group 132, the lenses that are disposed further toward a pupil conjugate position Ps side than a fundus conjugate position, which is in a conjugate relationship with the fundus of the subject eye 12, may be classified as the first lens group 134, and the lenses that are disposed further toward the subject eye 12 side than the fundus conjugate position may be classified as the second lens group. Further, at the first lens group 134 and the second lens group 132, with the region between adjacent lenses, which is a predetermined gap that is set in advance, being considered to be a boundary, the lenses that are disposed further toward the pupil conjugate position Ps side than this boundary may be classified as the first lens group, and the lenses that are disposed further toward the subject eye 12 side than this boundary may be classified as the second lens group.

Note that, although not illustrated, the imaging optical system 116A can have an optical module that includes a fixation lamp that provides a fixation target, a camera and an illumination device, and the optical module, i.e., the fixation lamp, the camera, and the optical path of the illumination device, can be disposed so as to be combined into the optical path of the imaging optical system 116A by a beam splitter or the like.

The imaging optical system 116A has the objective lens 130 that functions as a posterior eye portion observing optical system that observes at least the posterior eye portion of the subject eye 12. Due to the imaging optical system 116A having an optical module for anterior eye portion observation that can be inserted onto and removed from the optical path of the objective lens 130, and the optical module for anterior eye portion observation being placed on the optical path of the objective lens 130, the imaging optical system 116A can be switched from the posterior eye portion observing optical system to the anterior eye portion observing optical system. In the first embodiment, the imaging optical system 116A is described with the focus being on the posterior eye portion observing optical system, and description of the imaging optical system 116A, which functions as an anterior eye portion observing optical system in which an optical module for anterior eye portion observation is placed on the optical path of the objective lens 130, is omitted.

Figure 3:
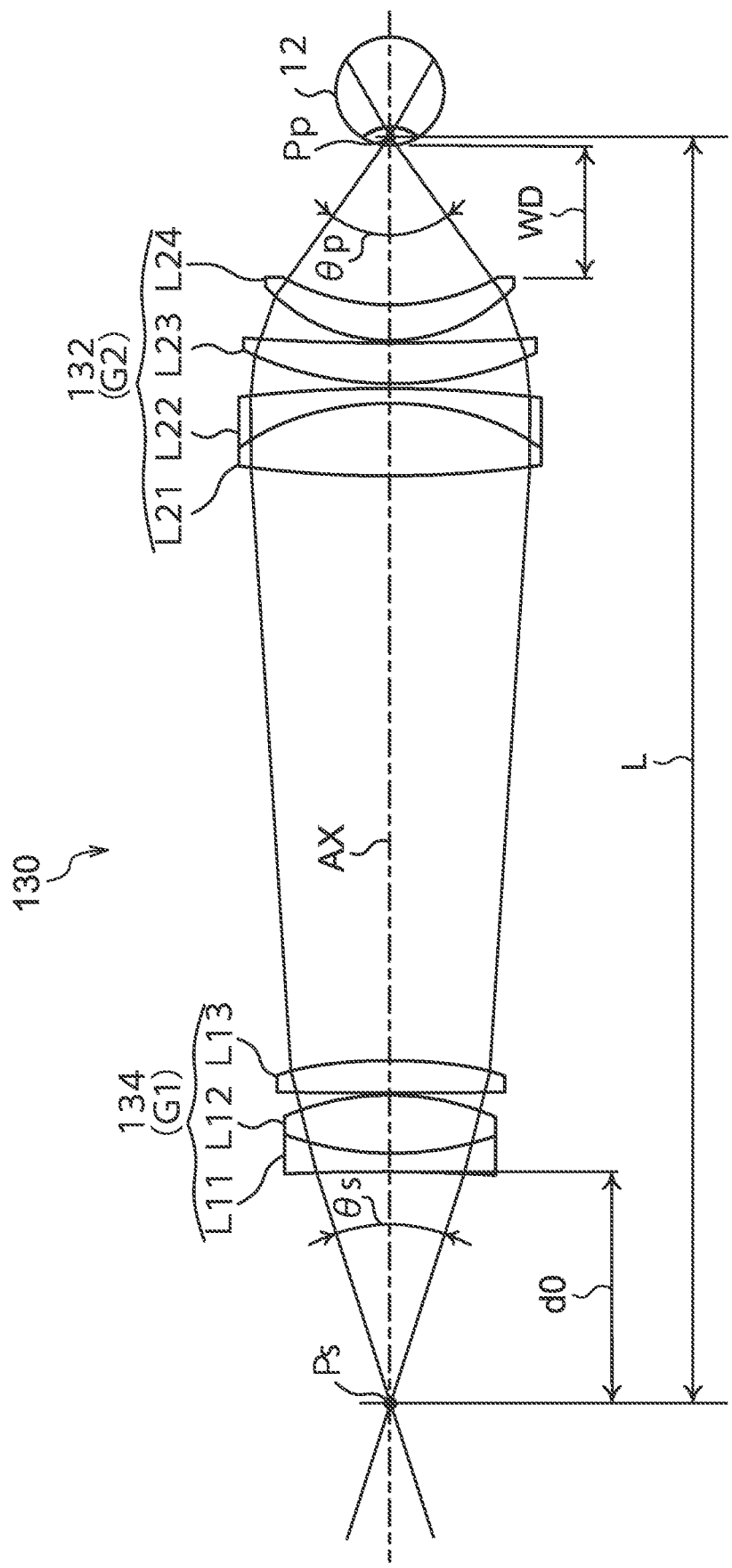
FIG. 3 is a schematic structural drawing illustrating an example of specific structures of a first lens group and a second lens group that are included in an objective lens structuring the imaging optical system.

An example of specific structures of the first lens group 134 (G1) and the second lens group 132 (G2), which are included in the objective lens 130 structuring the imaging optical system 116A that functions as a posterior eye portion observing optical system that observes the posterior eye portion of the subject eye 12, is illustrated in FIG. 3.

As illustrated in FIG. 3, the objective lens 130 is disposed such that the scanning center position (the position marked Ps in FIG. 3) of the horizontal scanning section 142 and the vertical scanning section 148 is conjugate with pupil position Pp of the subject eye 12. Namely, the scanning center position of the scanning sections is pupil position (hereinafter called pupil conjugate position) Ps that has a conjugate relationship with the pupil position Pp of the subject eye 12. In a SLO optical system, the SLO laser light that is scanned by the vertical scanning section 120 and the horizontal scanning section 142 goes through the objective lens 130 and is angle-scanned two-dimensionally with the pupil position Pp of the subject eye 12 being the center. As a result, the collected point of the SLO laser light is scanned two-dimensionally at the fundus 12A. Further, at the OCT optical system as well, similarly, the measurement light that is scanned by the vertical scanning section 148 and the horizontal scanning section 142 goes through the objective lens 130 and is angle-scanned two-dimensionally with the pupil position Pp of the subject eye 12 being the center. As a result, the collected point of the measurement light is scanned two-dimensionally at the fundus 12A. In a case of observing the posterior eye portion, a fundus two-dimensional image is acquired by the SLO unit 18, and a fundus tomographic image is acquired by the OCT unit 20.

The objective lens 130 has plural lens groups, i.e., the first lens group 134 (G1) that is positive and the second lens group 132 (G2) that is positive, and the positive first lens group 134 and the positive second lens group 132 form an afocal system. As illustrated as an example, the first lens group 134 includes, in order from the pupil conjugate position Ps side, i.e., the side of the horizontal scanning section 142 that is nearest (hereinafter called scanning section side) toward the subject eye side, a lens component (a cemented lens of lens L11 and lens L12) that is shaped as a meniscus whose convex surface faces the scanning section side, and a positive lens L13 having a convex surface at the scanning section side. Note that "lens component" in the present specification means a lens in which there are two interfaces that contact air on the optical axis. One lens component means one single lens, or one cemented lens that is structured by plural lenses being cemented together. A case in which the meniscus-shaped lens component of the first lens group 134 is a cemented lens as illustrated is effective for chromatic aberration correction, but the lens component of the first lens group 134 can be made to be a single lens in a case in which the wavelength region of the lights that are used is relatively narrow.

As an example, the second lens group 132 (G2) includes, in order from the scanning section side toward the subject eye side, a biconvex, positive lens component (a cemented lens of positive lens L21 and negative lens L22), a positive lens L23 whose convex surface faces the scanning section side, and a positive meniscus lens L24 whose convex surface faces the scanning section side. A case in which the biconvex, positive lens component of the second lens group 132 is a cemented lens as illustrated is effective for chromatic aberration correction, but the lens component of the second lens group 132 can be made to be a single lens in a case in which the wavelength region of the lights that are used is relatively narrow.

Here, due to the imaging optical system 116A forming a wide angle optical system, observation in a wide field of view FOV at the fundus 12A is realized. The field of view FOV means the range that can be imaged by the imaging device 14. The field of view FOV can be expressed as the viewing angle. In the first embodiment, the viewing angle can be prescribed by the internal illumination angle and the external illumination angle. The external illumination angle is the illumination angle in which the illumination angle of the light bundle, which is illuminated from the ophthalmic device 110 toward the subject eye 12, is prescribed by using the pupil 27 as the reference. Further, the internal illumination angle is the illumination angle in which the illumination angle of the light bundle, which is illuminated toward the fundus 12A, is prescribed by using eyeball center O as the reference. The external illumination angle and the internal illumination angle are in a corresponding relationship. For example, in a case in which the external illumination angle is 120°, the internal illumination angle corresponds to approximately 160°.

Among conventional fundus scanning devices, for example, there are fundus scanning devices of a narrow field angle whose field of view FOV is from 30° to 45°, and there are fundus scanning devices of a wide field angle whose field of view FOV exceeds 100°. With a fundus scanning device of a narrow field angle, there is the problem that the range that can be observed all at once is limited, and there are cases in which imaging of plural times (e.g., 7 times) is needed in order to broaden the observation range. With a fundus scanning device of a wide field angle, there is the problem that the optical structure is complex and large, and, as a result, the cost is high. Thus, the first embodiment provides an optical system that enables observation over a wide range, and can reduce the number of times for imaging the entire fundus, and that can suppress an increase in costs. Specifically, in the first embodiment, there is provided an objective lens that serves as an example of an ophthalmic optical system that makes it possible to obtain an ophthalmic device of a medium field angle of a field of view FOV of around 70°.

In a case of forming the objective lens 130 that has a medium-angle field of view, a range that encompasses the observation range that doctors and the like require for fundus observation can be formed as the field of view FOV. For example, a range, which is covered in cases of carrying out observation a predetermined number of times (e.g., 7 times) in an observation range for a single instance of observation in ETDRS (Early Treatment Diabetic Retinopathy Study), is made to be the field of view FOV. In this case, the system can be structured such that the field of view FOV by the objective lens 130 that has a medium-angle field of view satisfies following conditional expression (1).

$$60°≤FOV≤80° \quad (1)$$

By structuring the system in this way, by making 60°≤FOV, fundus observation in a medium-angle field of view, which is a range encompassing the seven times of observation in accordance with ETDRS, is possible. Further, by making FOV≤80°, an increase in cost, which is due to at least one of an increase in the lens diameter of the objective lens 130 and an increase in the number of lenses, can be suppressed.

Note that, in conditional expression (1), the field of view FOV may be prescribed as being a field of view that exceeds 60°. Further, in conditional expression (1), the field of view FOV may be prescribed as being less than 80°. 60° that is the lower limit of the field of view FOV is a value that is preferable in order to prescribe a range that encompasses the seven times of observation in accordance with ETDRS. 80° that is the upper limit of the field of view FOV is a value that is preferable in order to suppress an increase in cost due to at least one of an increase in the lens diameter of the objective lens 130 and an increase in the number of lenses. There are cases in which these upper limit and lower limit vary in accordance with the set conditions, and further, the system may be structured such that at least one of the upper limit and the lower limit is satisfied.

Incidentally, optimization of pupil aberration is necessary in order to obtain an ophthalmic device with a medium field angle (a field of view (FOV) of around) 70°. In the first embodiment, the pupil aberration is defined as the lateral aberration in the image surface in a case in which light beam tracking is carried out using the scanning center position of the scanning section (the pupil conjugate position Ps) as the object point, and the pupil position (the exit pupil position) as the image point. In a case in which this pupil aberration is greater than the pupil diameter of a human eye (e.g., around 2 mm to 4 mm in non-mydriatic imaging), at the time of scanning the scanning light, the scanning light at the field of view perimeter is vignetted at the pupil. The pupil aberration increases as the FOV becomes larger. Accordingly, correction (optimization) of pupil aberration is needed in order to avoid vignetting of the scanning light at the pupil.

Here, in the structural example illustrated in FIG. 3, in a case of forming the objective lens 130 that has a medium-angle field of view, given that the distance from the pupil conjugate position Ps that is in a conjugate relationship with the pupil of the subject eye 12 to the pupil position Pp of the subject eye 12 is L, and that the sum of the central thicknesses of the lenses included in the objective lens 130 is D, the system is structured so as to satisfy following conditional expression (2).

$$0.1 \leq D/L \leq 0.25 \qquad (2)$$

Due to such a structure, SLO imaging at a medium-angle field of view is possible, and OCT imaging in all regions of medium field angles is possible.

In conditional expression (2), 0.1 that is the lower limit and 0.25 that is the upper limit are values that are preferable in order to reduce the total weight of the objective lens 130 and improve the transmittance rate of the objective lens 130. There are cases in which these upper limit and lower limit vary in accordance with the set conditions, and further, the system may be structured such that at least one of the upper limit and the lower limit is satisfied. Note that, in order to reduce the total weight of the objective lens 130 and improve the transmittance rate of the objective lens 130, it is even more preferable that the system be structured so as to satisfy following conditional expression (3).

$$0.15 \leq D/L \leq 0.25 \qquad (3)$$

Further, optimization of the angular magnification at the objective lens 130 is required in order to obtain a fundus scanning device of a medium field angle. Specifically, if the angular magnification is low, the field angle is large, and the cost of the objective lens 130 increases. On the other hand, if the angular magnification is high, the requisite accuracy relating to scanning is high accuracy, and the cost increases. Therefore, optimization of the angular magnification is required.

In the structural example illustrated in FIG. 3, in a case of forming the objective lens 130 that has a medium-angle field of view, the system is structured so as to satisfy following conditional expression (4), where the field angle from the pupil that has a conjugate relationship with the pupil of the subject eye 12, i.e., from the pupil conjugate position Ps, is θs, and the field angle from the pupil of the subject eye 12 is θp.

$$1.6 \leq \theta p/\theta s \leq 4.0 \qquad (4)$$

Due to such a structure, by making 1.6≤θp/θs, enlarging of the aperture of the lens that accompanies an increase in the scanning angle of the scanning section can be suppressed, and increased cost of the objective lens 130 in an imaging optical system of a medium-angle field of view can be suppressed. Further, by making θp/θs≤4.0, the difference between the field angle θs (the scanning angle) and the field angle θp is suppressed, and effects of errors of the scanning element at the scanning section can be suppressed. Further, with θp/θs being angular magnification B, conditional expression (4) can be expressed as 1.6≤β≤4.0.

In conditional expression (4), 1.6 that is the lower limit is a value that is preferable in order to suppress an increase in cost due to enlarging of the aperture of the objective lens 130 that accompanies an increase in the field angle from the pupil conjugate position Ps (the maximum scanning angle of the scanning section). 4.0 that is the upper limit is a value that is preferable in order to enable suppression of effects due to errors of the scanning element (e.g., a galvano mirror) at the scanning section. It is preferable to structure the objective lens 130 in the range of these upper limit and lower limit. Further, the objective lens 130 may be structured so as to satisfy at least one of these upper limit and lower limit. Note that, in consideration of an increase in the scanning angle of the scanning section and the effects due to errors of the scanning element, the system can also be structured so as to satisfy following conditional expression (5).

$$0.15 \leq \theta p/\theta s \leq 4.0 \qquad (5)$$

In conditional expression (4), the angular magnification β is prescribed as θp/θs, but similar effects can be obtained even with only the field angle from the pupil conjugate position Ps (the scanning angle of the scanning section). Namely, in the structural example illustrated in FIG. 3, in a case of forming the objective lens 130 of a medium-angle field of view, the system can be structured so as to satisfy following conditional expression (6), where the field angle from the pupil that has a conjugate relationship with the pupil of the subject eye 12, i.e., from the pupil conjugate position Ps (the maximum scanning angle of the scanning section), is s.

$$30° \leq \theta s \leq 45° \qquad (6)$$

Due to this structure, by making 30°≤θs, effects due to errors of the scanning element (e.g., a galvano mirror) can be suppressed. By making θs≤45°, increased cost due to an enlarged aperture of the objective lens 130 can be suppressed.

In conditional expression (6), 30° that is the lower limit is a value that is preferable in order to suppress effects due to errors of the scanning element (e.g., a galvano mirror) at the scanning section. Further, 45° that is the upper limit is a value that is preferable in order to suppress an increase in cost due to enlarging of the aperture of the objective lens 130 that accompanies an increase in the field angle from the pupil conjugate position Ps (the maximum scanning angle of the scanning section). There are cases in which these upper limit and lower limit vary in accordance with the set conditions, and further, the system may be structured such that at least one of the upper limit and the lower limit is satisfied.

By the way, the focal distance of the first lens group and the focal distance of the second lens group at the objective lens 130 affect the obtaining of a fundus scanning device of a medium field angle. Specifically, due to the relationship between the focal distance of the first lens group and the focal distance of the second lens group, the system is affected by errors in the scanning element at the scanning section, and increased cost due to enlarging of the aperture of the lens is brought about. Therefore, optimization of the relationship between the focal distance of the first lens group and the focal distance of the second lens group is required.

In the structural example illustrated in FIG. 3, the system is structured so as to satisfy following conditional expression (7), where the focal distance of the first lens group of the objective lens 130 is f1, and the focal distance of the second lens group is f2.

$$0.3 \leq f2/f1 \leq 0.6 \qquad (7)$$

Due to this structure, by making 0.3≤f2/f1, effects of errors of the scanning element at the scanning section can be suppressed. Further, by making f2/f1≤0.6, increased cost of the objective lens 130 at the imaging optical system of a medium-angle field of view can be suppressed.

In conditional expression (7), 0.3 that is the lower limit is a value that is preferable in order to suppress effects due to errors of the scanning element (e.g., a galvano mirror) at the scanning section. Further, 0.6 that is the upper limit is a value that is preferable in order to suppress an increase in cost due to enlarging of the aperture of the objective lens 130 that accompanies an increase in the field angle from the pupil conjugate position Ps (the maximum scanning angle of the scanning section). There are cases in which these upper limit and lower limit vary in accordance with the set conditions, and further, the system may be structured such that at least one of the upper limit and the lower limit is satisfied.

In order to obtain a fundus scanning device of a medium field angle (field of view FOV around) 70°, optimization of the working distance of the objective lens 130 is required. Specifically, with regard to the working distance, there is the concern that, if the working distance is short, the lens will interfere with the subject eye 12 or the face of the person being subjected. On the other hand, if the working distance is long, the lens diameter must be made large, and costs increase. Therefore, optimization of the working distance is needed.

In the structural example illustrated in FIG. 3, the objective lens 130 is structured so as to satisfy following conditional expression (8), where the distance (working distance) from the subject eye 12 side end portion of the objective lens 130 to the pupil position of the subject eye 12 is WD.

$$20 \text{ mm} \leq WD \leq 40 \text{ mm} \tag{8}$$

In this structure, by structuring the objective lens 130 such that WD≤40 mm, enlarging of the aperture of the objective lens 130 and an increase in the number of lenses are suppressed, and an increase in costs can be suppressed. By structuring the objective lens 130 such that 20 mm≤WD, interference between the objective lens 130 and the face of the person being subjected can be avoided.

Note that WD may be the distance from the end portion on the optical axis AX at the subject eye 12 side of the objective lens 130, to the pupil position of the subject eye 12. Or, WD may be the distance from the end portion on the optical axis AX at the subject eye 12 side of the objective lens 130, to the end portion at the subject eye 12 side.

In conditional expression (8), 20 mm that is the lower limit is a value that is preferable in order to suppress enlarging of the aperture of the objective lens 130 and an increase in the number of lenses. 4.0 mm that is the upper limit is a value that is preferable in order to suppress interference between the objective lens 130 and the face of the person being subjected. There are cases in which these upper limit and lower limit vary in accordance with the set conditions, and further, the system may be structured such that at least one of the upper limit and the lower limit is satisfied.

In above conditional expression (7), the ratio (f2/f1) of the focal distance f1 of the first lens group of the objective lens 130 and the focal distance f2 of the second lens group is prescribed, but effects at the objective lens 130 can be obtained even by prescribing only the focal distance f2 of the second lens group. Namely, given that the focal distance of the second lens group is f2, the objective lens 130 can be structured so as to satisfy following conditional expression (9).

$$40 \text{ mm} \leq f2 \leq 60 \text{ mm} \tag{9}$$

Due thereto, by making f2≤60 mm, the working distance WD of the objective lens 130 can be ensured. Further, by making 40 mm≤f2, enlarging of the aperture of the objective lens 130 and an increase in the number of lenses can be suppressed, and an increase in cost can be suppressed. 40 mm that is the lower limit value is a value that is preferable in order to ensure a predetermined distance, which is set in advance, as the working distance WD of the objective lens 130. 60 mm that is the upper limit is a value that is preferable in order to suppress enlarging of the aperture of the objective lens 130 and an increase in the number of lenses.

By the way, in a case in which an optical element, for example, the optical element (e.g., a galvano mirror) of the scanning section, is placed at the pupil conjugate position Ps, it is preferable to ensure the distance between the pupil conjugate position Ps and the scanning element so that the outer shape of the scanning element (including the range of operation when accompanied by operation) does not interfere with the objective lens 130. Therefore, optimization of the distance between the pupil conjugate position Ps and the element (e.g., the scanning element) that is disposed at that pupil conjugate position Ps is required.

In the structural example illustrated in FIG. 3, given that the distance from the scanning section side end portion of the objective lens 130 to the pupil conjugate position Ps that has a conjugate relationship with the pupil of the subject eye is d0, the objective lens 130 is structured so as to satisfy following conditional expression (10).

$$15 \text{ mm} \leq d0 \tag{10}$$

By structuring the objective lens 130 in this way, interference between the objective lens 130 and the element (e.g., the scanning element) that is disposed at the pupil conjugate position Ps can be suppressed.

In conditional expression (10), 15 mm that is the lower limit is a condition that is suitable in order to suppress interference between the objective lens 130 and the element (e.g., the scanning element) that is disposed at the pupil conjugate position Ps.

By structuring the objective lens 130 in accordance with the above-described first embodiment, there can be provided an ophthalmic device in which the number of times of imaging that makes at least wide-range observation possible is reduced, and in which an increase in cost is suppressed, and that makes observation of a medium field angle of a field of view FOV of around 70° possible.

Note that, in the first embodiment, a case is described in which light is scanned by the horizontal scanning section 142 and the vertical scanning section 148, and polygon mirrors and galvano mirrors are given as examples of the horizontal scanning section 142 and the vertical scanning section 148. However, the technique of the present disclosure is not limited to this. For example, another optical element that can scan scanning light in the Y direction may be used, and examples thereof are a MEMS (Micro-electromechanical system) mirror, a rotating mirror, a prism, and a resonant mirror.

Further, with regard to the scanning of the scanning light in the first embodiment, similar scanning can, of course, be carried out even if the X direction and the Y direction are switched.

SUITABLE EXAMPLES

Examples of the objective lens 130 of the technique of the present disclosure are described next.

Example 1

Figure 4:
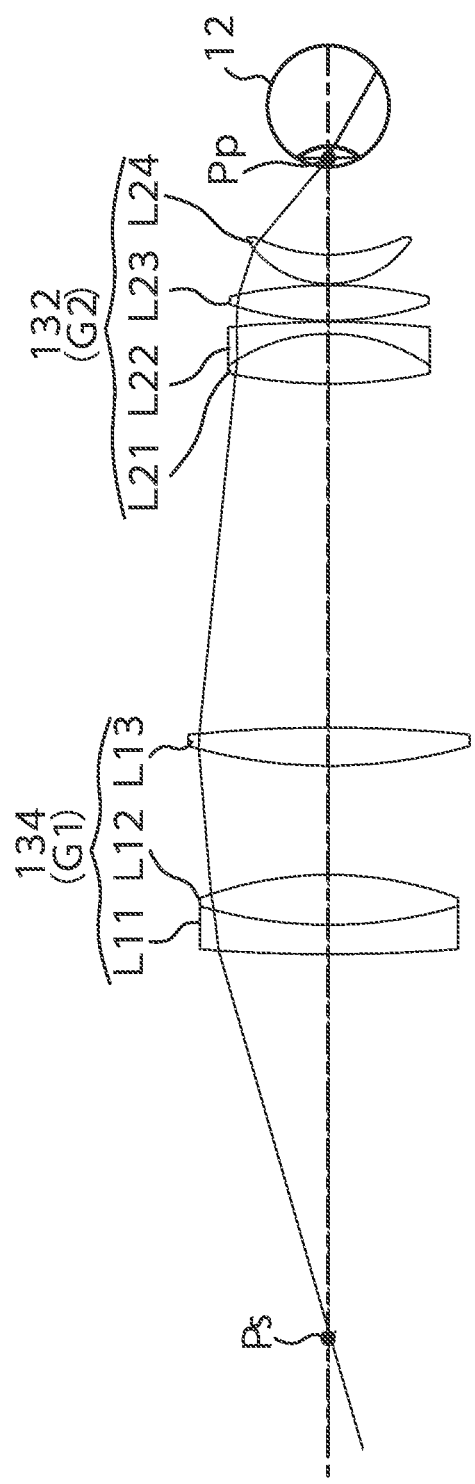
FIG. 4 is a schematic structural drawing illustrating an example of the lens structure of an objective lens relating to Example 1.

An example of the lens structure of the objective lens 130 relating to Example 1 is illustrated in FIG. 4. Objective lens 1360 is a refractive optical system that includes the lenses L11~ L24.

FIG. 4 illustrates the pupil conjugate position Ps that is common to the scanning center position of the scanning section, and the pupil position Pp of the subject eye 12. Note that Ps and Pp in the drawing are illustrated in order to illustrate positions in the optical axis direction, and the drawing is not intended to illustrate the shapes and sizes thereof. The objective lens 130 includes, in order from the scanning section side, the first lens group 134 (G1) and the second lens group 132 (G2). In the following description, the first lens group 134 is called the first lens group G1, and the second lens group 132 is called the second lens group G2. The first lens group G1 and the second lens group G2 are separated by the longest air gap within the objective lens 130.

The first lens group G1 includes, in order from the pupil conjugate position Ps side that is the scanning section side toward the subject eye side, the negative meniscus lens L11 whose convex surface faces the scanning section side, the positive lens L12 having a convex surface at the scanning section side, and the positive lens L13 having a convex surface at the scanning section side. The lens L11 and the lens L12 are cemented together, and form a lens component that is shaped as a positive lens whose convex surface faces the scanning section side.

The second lens group G2 includes, in order from the scanning section side toward the subject eye side, the positive lens L21 having a convex surface at the scanning section side, the negative meniscus lens L22 whose concave surface faces the scanning section side, the positive lens L23, and the positive meniscus lens L24 whose convex surface faces the scanning section side. The lens L21 and the lens L22 are cemented together, and form a lens component that is shaped as a positive lens.

Lens data of Example 1 is illustrated in Table 1. The lens data illustrates, in order from the left column, the surface number (No.), the radius of curvature (R), the surface gap (D) on the optical axis, the refractive index (nd) based on the d line (wavelength 587.56 nm), and the Abbe number (vd) based on the d line. The 1st surface of the lens data is the pupil conjugate position Ps that is common to the scanning center position of the scanning section. The value in the final row of the D column expresses the distance, on the optical axis, from the lens surface that is furthest toward the subject eye side in the table to the pupil position Pp.

TABLE 1

| No. | R | D | nd | vd |
|---|---|---|---|---|
| 0 |  | 128.74 |  |  |
| 1 | 569.129 | 10.00 | 1.860740 | 23.07 |
| 2 | 151.885 | 17.00 | 1.617720 | 49.81 |
| 3 | −123.798 | 37.16 |  |  |
| 4 | 170.662 | 13.00 | 1.497820 | 82.57 |
| 5 | −460.407 | 117.10 |  |  |
| 6 | 167.100 | 17.00 | 1.497820 | 82.57 |
| 7 | −58.441 | 4.00 | 1.860740 | 23.07 |
| 8 | −318.269 | 0.50 |  |  |
| 9 | 104.135 | 12.00 | 1.497820 | 82.57 |
| 10 | −147.471 | 0.50 |  |  |
| 11 | 33.000 | 10.00 | 1.801000 | 34.92 |
| 12 | 56.338 | 33.00 |  |  |

Figure 5:
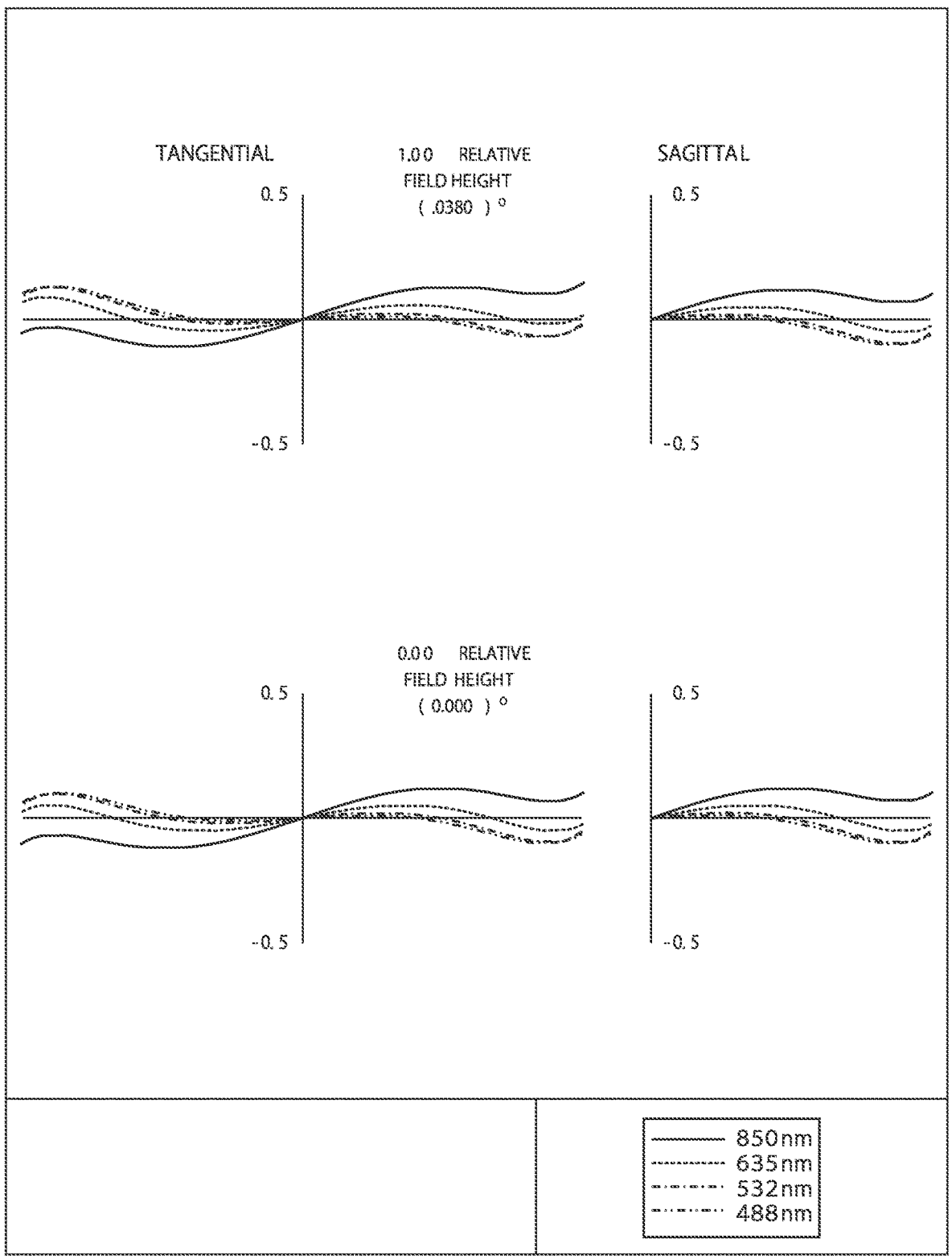
FIG. 5 is an aberration graph illustrating pupil aberration of the objective lens relating to Example 1.

FIG. 5 is a graph of pupil aberration (lateral aberration at the exit pupil) of the objective lens that is structured by the various items of Table 1. In the pupil aberration graph of FIG. 5, image height is on the vertical axis, the solid line illustrates a central wavelength of 850.0 nm, the dashed line illustrates 633.0 nm, the one-dot chain line illustrates 532.0 nm, and the two-dot chain line illustrates 488.0 nm.

As is clear from the pupil aberration graph illustrated in FIG. 5, it is clear that the objective lens of Example 1 has excellent performances as an objective lens suited for use in an ophthalmic device of a medium field angle of a field of view FOV of around 70°. Note that, although not illustrated, it is confirmed that various aberrations such as spherical aberration, astigmatism, distortion aberration and the like also are corrected well.

Example 2

Figure 6:
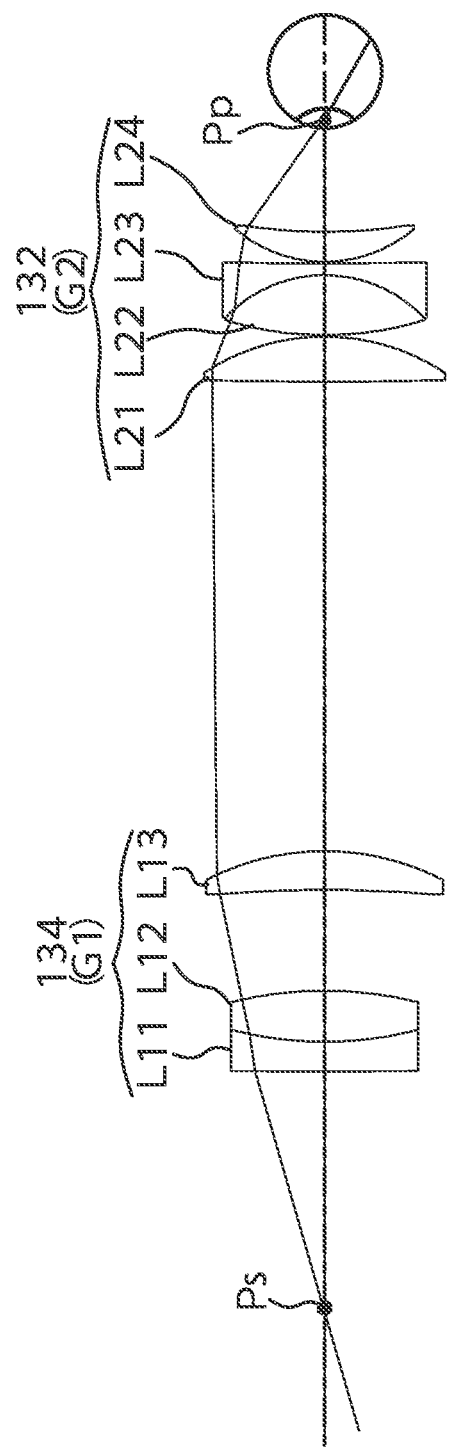
FIG. 6 is a schematic structural drawing illustrating an example of the lens structure of an objective lens relating to Example 2.

An example of the lens structure of the objective lens 130 relating to Example 2 is illustrated in FIG. 6. Note that, because Example 2 has a structure that is similar to Example 1, the same portions are denoted by the same reference numerals, and detailed description thereof is omitted.

The first lens group G1 includes, in order from the pupil conjugate position Ps side that is the scanning section side toward the subject eye side, the negative meniscus lens L11 whose convex surface faces the scanning section side, the positive lens L12 having a convex surface at the scanning section side, and the positive meniscus lens L13 having a concave surface at the scanning section side. The lens L11 and the lens L12 are cemented together, and form a lens component that is shaped as a positive lens.

The second lens group G2 includes, in order from the scanning section side toward the subject eye side, the positive lens L21 having a convex surface at the scanning section side, the positive lens L22 having a convex surface at the scanning section side, the negative meniscus lens L23 whose concave surface faces the scanning section side, and the positive meniscus lens L24 whose convex surface faces the scanning section side. The lens L22 and the lens L23 are cemented together, and form a lens component that is shaped as a positive lens.

Lens data of Example 1 is illustrated in Table 2.

TABLE 2

| No. | R | D | nd | vd |
|---|---|---|---|---|
| 0 |  | 80.08 |  |  |
| 1 | 3545.072 | 10.00 | 1.805180 | 25.44 |
| 2 | 120.964 | 17.00 | 1.563840 | 60.70 |
| 3 | −126.620 | 33.65 |  |  |
| 4 | −450.302 | 13.00 | 1.518600 | 69.89 |
| 5 | −84.218 | 156.84 |  |  |
| 6 | 1651.717 | 15.00 | 1.518600 | 69.89 |
| 7 | −71.505 | 0.50 |  |  |
| 8 | 110.291 | 20.00 | 1.563840 | 60.70 |
| 9 | −45.069 | 4.00 | 1.860740 | 23.07 |
| 10 | 2389.739 | 0.50 |  |  |
| 11 | 45.190 | 10.00 | 1.850260 | 32.35 |
| 12 | 172.145 | 38.00 |  |  |

Figure 7:
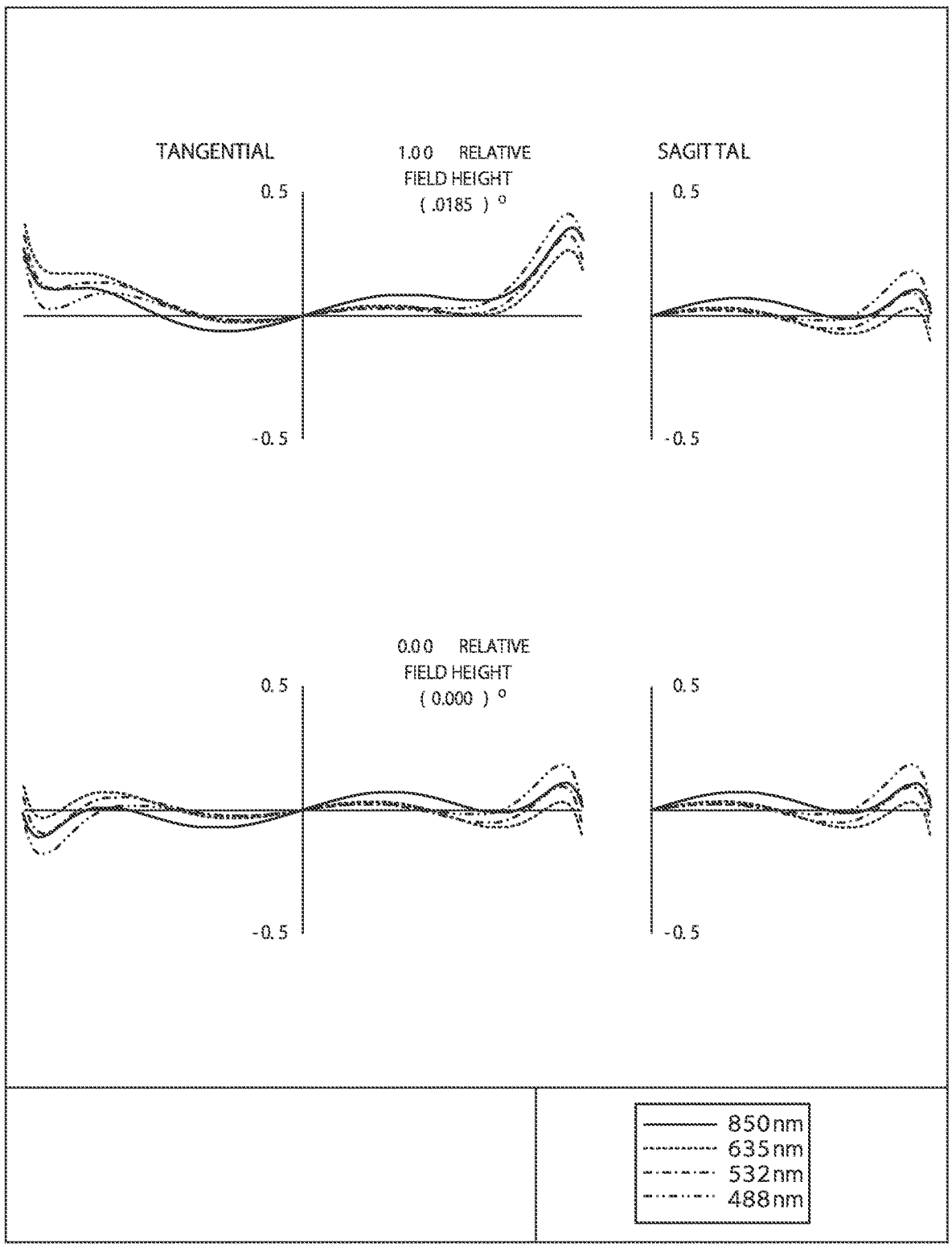
FIG. 7 is an aberration graph illustrating pupil aberration of the objective lens relating to Example 2.

FIG. 7 is a graph of pupil aberration (lateral aberration at the exit pupil) of the objective lens that is structured by the various items of Table 2.

As is clear from the pupil aberration graph illustrated in FIG. 7, it is clear that the objective lens of Example 2 has excellent performances as an objective lens suited for use in an ophthalmic device of a medium field angle of a field of view FOV of around 70°. Note that, although not illustrated, it is confirmed that various aberrations such as spherical aberration, astigmatism, distortion aberration and the like also are corrected well.

Example 3

Figure 8:
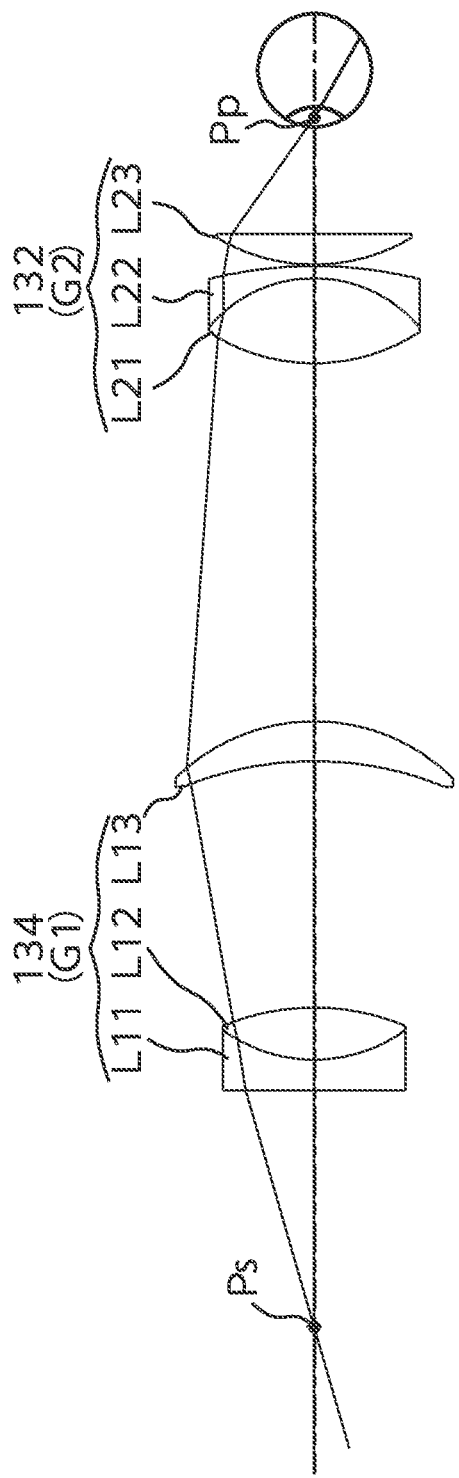
FIG. 8 is a schematic structural drawing illustrating an example of the lens structure of an objective lens relating to Example 3.

An example of the lens structure of the objective lens 130 relating to Example 3 is illustrated in FIG. 8. Note that, because Example 3 has a structure that is similar to Example 1, the same portions are denoted by the same reference numerals, and detailed description thereof is omitted.

The first lens group G1 includes, in order from the pupil conjugate position Ps side that is the scanning section side toward the subject eye side, the negative meniscus lens L11 whose convex surface faces the scanning section side, the positive lens L12 having a convex surface at the scanning section side, and the positive meniscus lens L13 having a concave surface at the scanning section side. The lens L11 and the lens L12 are cemented together, and form a lens component that is shaped as a positive lens.

The second lens group G2 includes, in order from the scanning section side toward the subject eye side, the positive lens L21 having a convex surface at the scanning section side, the negative meniscus lens L22 whose concave surface faces the scanning section side, and the positive lens L23. The lens L21 and the lens L22 are cemented together, and form a lens component that is shaped as a positive lens. Further, the lens surface, which is furthest toward the subject eye 12 side of the lens L23, is an aspherical surface.

Lens data of Example 3 is illustrated in Table 3.

TABLE 3

| No. | R | D | nd | vd |
|---|---|---|---|---|
| 0 |  | 77.30 |  |  |
| 1 | −7928.234 | 10.00 | 1.795040 | 28.69 |
| 2 | 50.000 | 17.00 | 1.623740 | 47.00 |
| 3 | −75.474 | 80.55 |  |  |
| 4 | −110.685 | 13.00 | 1.572500 | 57.29 |
| 5 | −63.363 | 117.10 |  |  |
| 6 | 62.316 | 27.76 | 1.497820 | 82.57 |
| 7 | −44.247 | 4.00 | 1.860740 | 23.07 |
| 8 | −138.182 | 0.50 |  |  |
| 9 | 61.061 | 10.00 | 1.851080 | 40.12 |
| 10 | aspherical surface | 38.00 |  |  |

At the aspherical surface listed in Table 3, when h represents the height in the direction orthogonal to the optical axis, zs represents the distance (sag amount) along the optical axis from the tangent plane at the apex of the aspherical surface to the position on the aspherical surface at height h, c represents the inverse of the radius of curvature of the near axis, k represents the constant of the cone, A represents the 4th-order aspherical coefficient, B represents the 6th-order aspherical coefficient, C represents the 8th-order aspherical coefficient, D represents the 10th-order aspherical coefficient and E represents the 12th-order aspherical coefficient, zs is expressed by the following formula.

$$zs = (c \cdot h^2)/[1 + \{1 - (1+k) \cdot h^2 \cdot c^2\}^{1/2}] + A \cdot h^4 + B \cdot h^6 + C \cdot h^8 + D \cdot h^{10} + E \cdot h^{12}$$

The aspherical coefficients of the aspherical surfaces in Example 3 are listed in Table 4. In Table 4, the aspherical coefficient A is listed as C4, B as C6, and C as C8. Further, listing of the aspherical coefficients D, E is omitted. "E−n" (n is an integer) in Table 4 means "×10$^{-n}$".

TABLE 4

| aspherical coefficient | surface 10 |
|---|---|
| R | −726.009 |
| K | 0 |
| C4 | 3.30E−06 |
| C6 | −5.27E−09 |
| C8 | 2.69E−12 |

Figure 9:
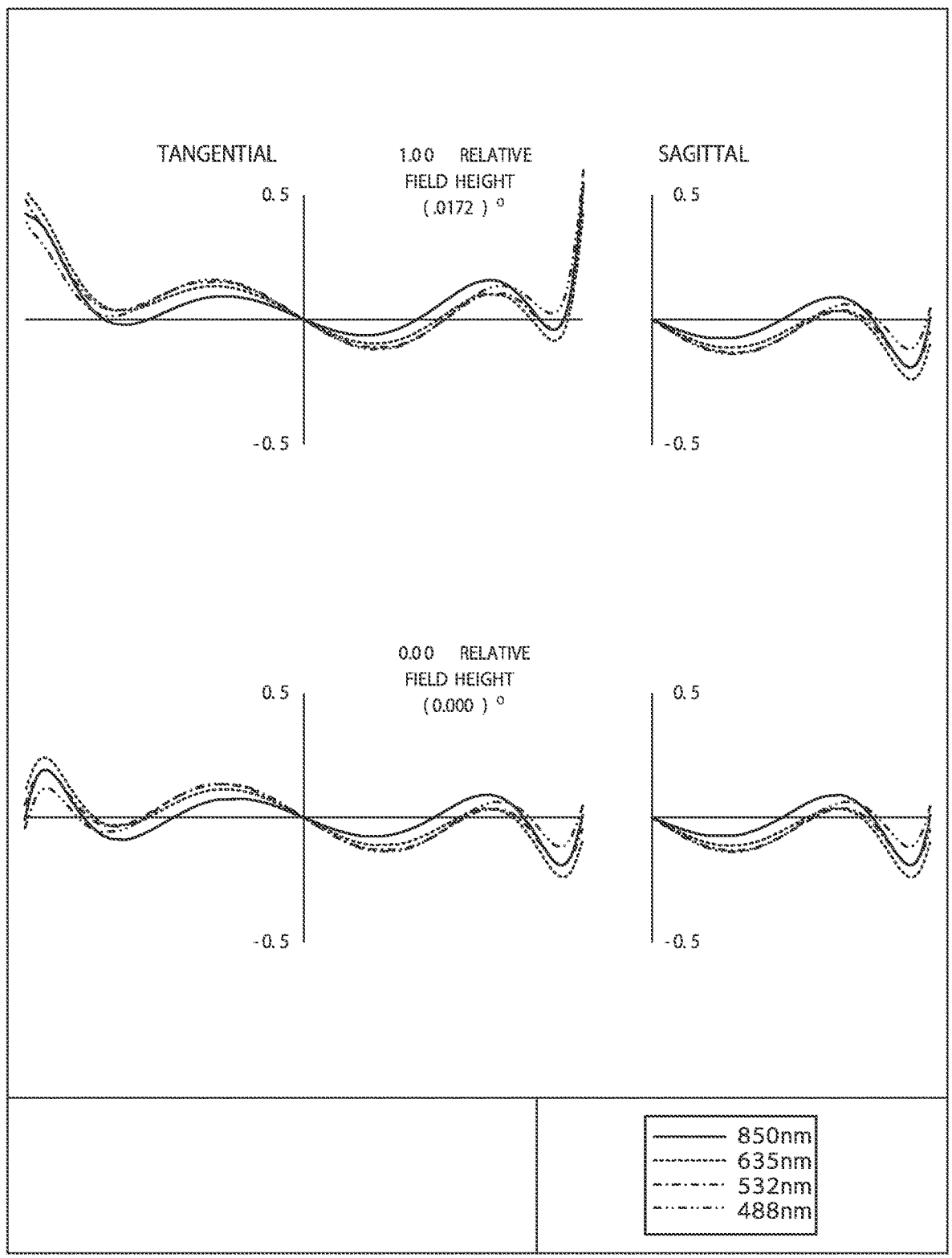
FIG. 9 is an aberration graph illustrating pupil aberration of the objective lens relating to Example 3.

FIG. 9 is a graph of pupil aberration (lateral aberration at the exit pupil) of the objective lens that is structured by the various items of Table 3 and Table 4. As is clear from the pupil aberration graph illustrated in FIG. 9, it is clear that the objective lens of Example 3 has excellent performances as an objective lens suited for use in an ophthalmic device of a medium field angle of a field of view FOV of around 70°. Note that, although not illustrated, it is confirmed that various aberrations such as spherical aberration, astigmatism, distortion aberration and the like also are corrected well.

Example 4

Figure 10:
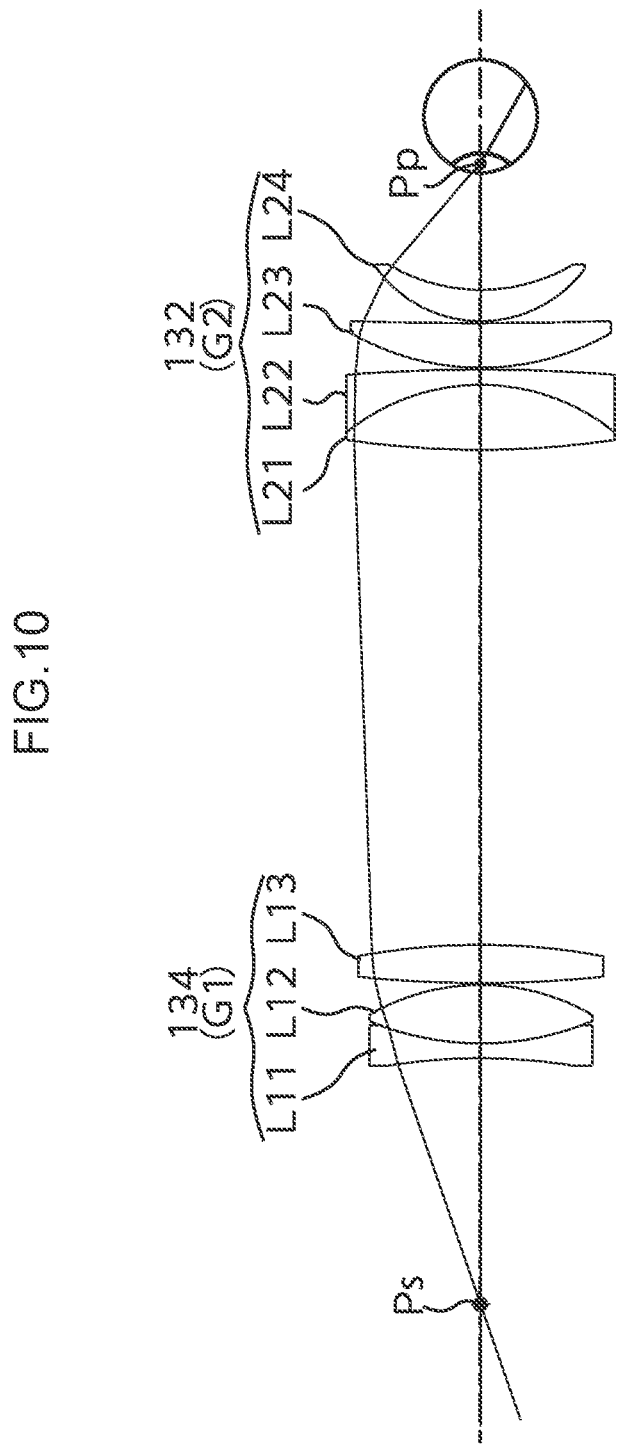
FIG. 10 is a schematic structural drawing illustrating an example of the lens structure of an objective lens relating to Example 4.

An example of the lens structure of the objective lens 130 relating to Example 4 is illustrated in FIG. 10. Note that, because Example 4 has a structure that is similar to Example 1, the same portions are denoted by the same reference numerals, and detailed description thereof is omitted.

The first lens group G1 includes, in order from the pupil conjugate position Ps side that is the scanning section side toward the subject eye side, the negative meniscus lens L11 whose concave surface faces the scanning section side, the positive lens L12 having a convex surface at the scanning section side, and the positive lens L13. The lens L11 and the lens L12 are cemented together, and form a lens component that is shaped as a positive lens.

The second lens group G2 includes, in order from the scanning section side toward the subject eye side, the positive lens L21 having a convex surface at the scanning section side, the negative meniscus lens L22 having a concave surface at the scanning section side, the positive meniscus lens L23 whose convex surface faces the scanning section side, and the positive meniscus lens L24 whose convex surface faces the scanning section side. The lens L21 and the lens L22 are cemented together, and form a lens component that is shaped as a positive lens.

Lens data of Example 4 is illustrated in Table 5.

TABLE 5

| No. | R | D | nd | vd |
|---|---|---|---|---|
| 0 |  | 64.44 |  |  |
| 1 | −150.364 | 3.90 | 1.801000 | 34.92 |
| 2 | 74.627 | 15.30 | 1.603110 | 60.59 |
| 3 | −57.127 | 0.50 |  |  |
| 4 | 310.877 | 10.00 | 1.804000 | 46.59 |
| 5 | −171.831 | 129.64 |  |  |
| 6 | 234.391 | 17.00 | 1.754998 | 52.32 |
| 7 | −54.790 | 4.00 | 1.805180 | 25.44 |
| 8 | −449.748 | 0.50 |  |  |
| 9 | 67.299 | 11.70 | 1.713000 | 53.95 |
| 10 | 1197.919 | 0.50 |  |  |
| 11 | 33.345 | 8.20 | 1.754998 | 52.32 |
| 12 | 46.636 | 33.42 |  |  |

Figure 11:
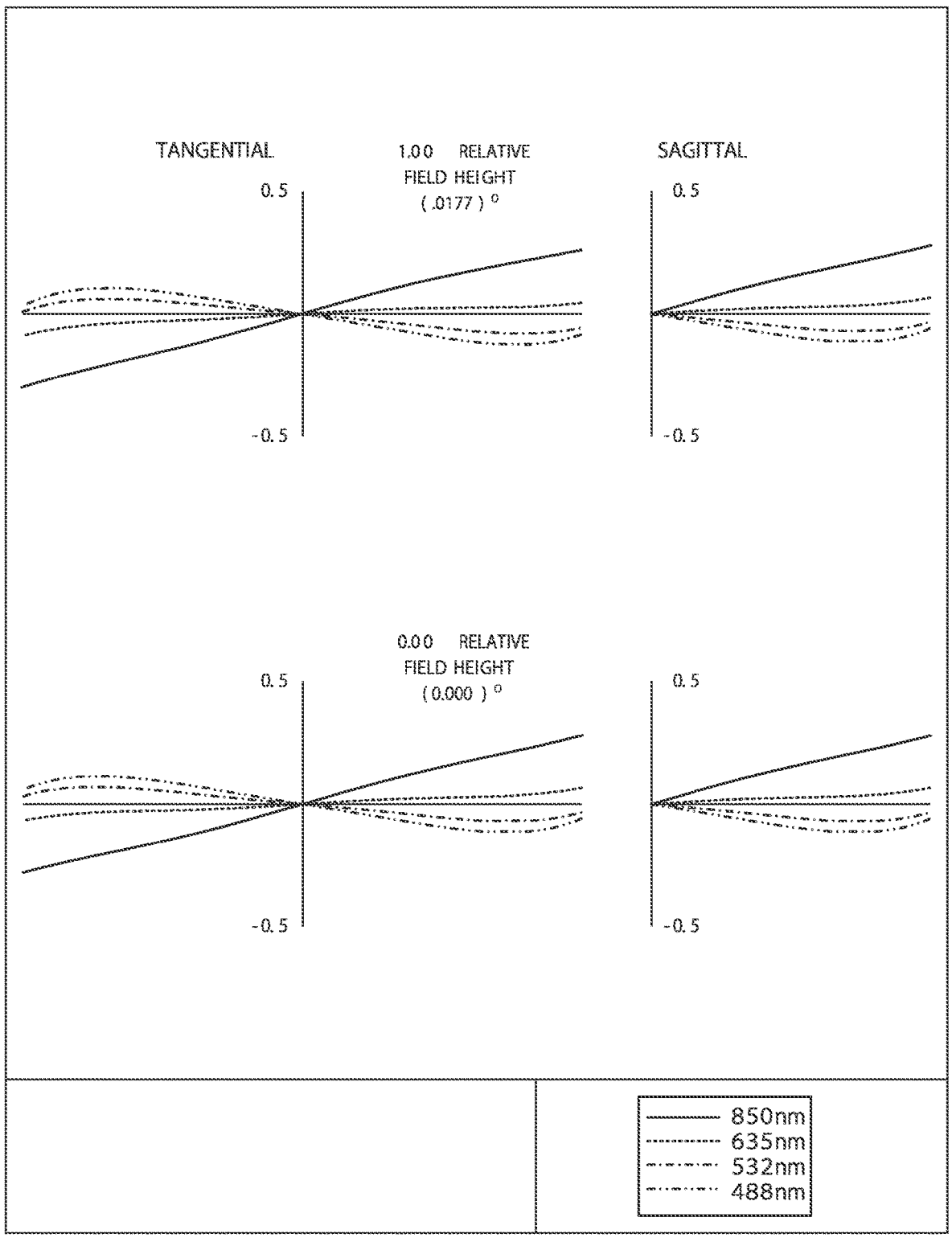
FIG. 11 is an aberration graph illustrating pupil aberration of the objective lens relating to Example 4.

FIG. 11 is a graph of pupil aberration (lateral aberration at the exit pupil) of the objective lens that is structured by the various items of Table 5.

As is clear from the pupil aberration graph illustrated in FIG. 11, it is clear that the objective lens of Example 4 has excellent performances as an objective lens suited for use in an ophthalmic device of a medium field angle of a field of view FOV of around 70°. Note that, although not illustrated, it is confirmed that various aberrations such as spherical aberration, astigmatism, distortion aberration and the like also are corrected well.

Next, the conformance of the above conditional expressions with the objective lenses in the respective Examples of above-described Example 1 through Example 4 is described. Values relating to the above conditional expressions for Example 1 through Example 4 respectively are listed in Table 6.

TABLE 6

|  | lower limit | upper limit | Example 1 | Example 2 | Example 3 | Example 4 |
|---|---|---|---|---|---|---|
| FOV | 60 | 80 | 80 | 70 | 70 | 80 |
| WD | 20 | 40 | 20 | 25 | 25 | 20 |
| D0 | 25 | 50 | 33 | 38 | 38 | 33.42 |
| f2 | 40 | 60 | 51.9 | 53.4 | 52.7 | 45.9 |
| f1 | 80 | 200 | 123.9 | 136.8 | 136 | 89.2 |
| β(θp/θs) | 1.5 | 4 | 2.5 | 2.6 | 2.6 | 1.9 |
| pupil aberration | — | 2 | 0.12 | 0.2 | 0.13 | 0.28 |
| BF | 15 | 128.7 | 80.1 | 77.3 | 50 |  |
| scanning angle | 30 | 45 | 32 | 32 | 32 | 37.7 |
| FOV/scanning angle | 2 | 4 | 2.50 | 2.19 | 2.19 | 2.12 |
| total length |  |  | 400.0 | 398.6 | 395.2 | 299.1 |
| sum of lens thicknesses |  |  | 83.0 | 89.0 | 81.8 | 70.1 |
| ratio (D/L) | 0.15 | 0.25 | 0.21 | 0.22 | 0.21 | 0.23 |
| f2/f1 |  |  | 0.419 | 0.390 | 0.388 | 0.515 |

As is clear from Table 6, it is clear that the objective lenses of Example 1 through Example 4 are in conformance with the above conditional expressions.

Second Embodiment

A second embodiment is described next. In the second embodiment, the objective lens 130, which is the main portion of the imaging optical system 116A relating to the first embodiment, is formed as an attached optical system, and can be attached to and removed from a portable terminal that has an imaging function. Because the structures of the second embodiment are substantially similar to the first embodiment, the same portions are denoted by the same reference numerals, and description thereof is omitted, and mainly the portions that are different are described.

Figure 12:
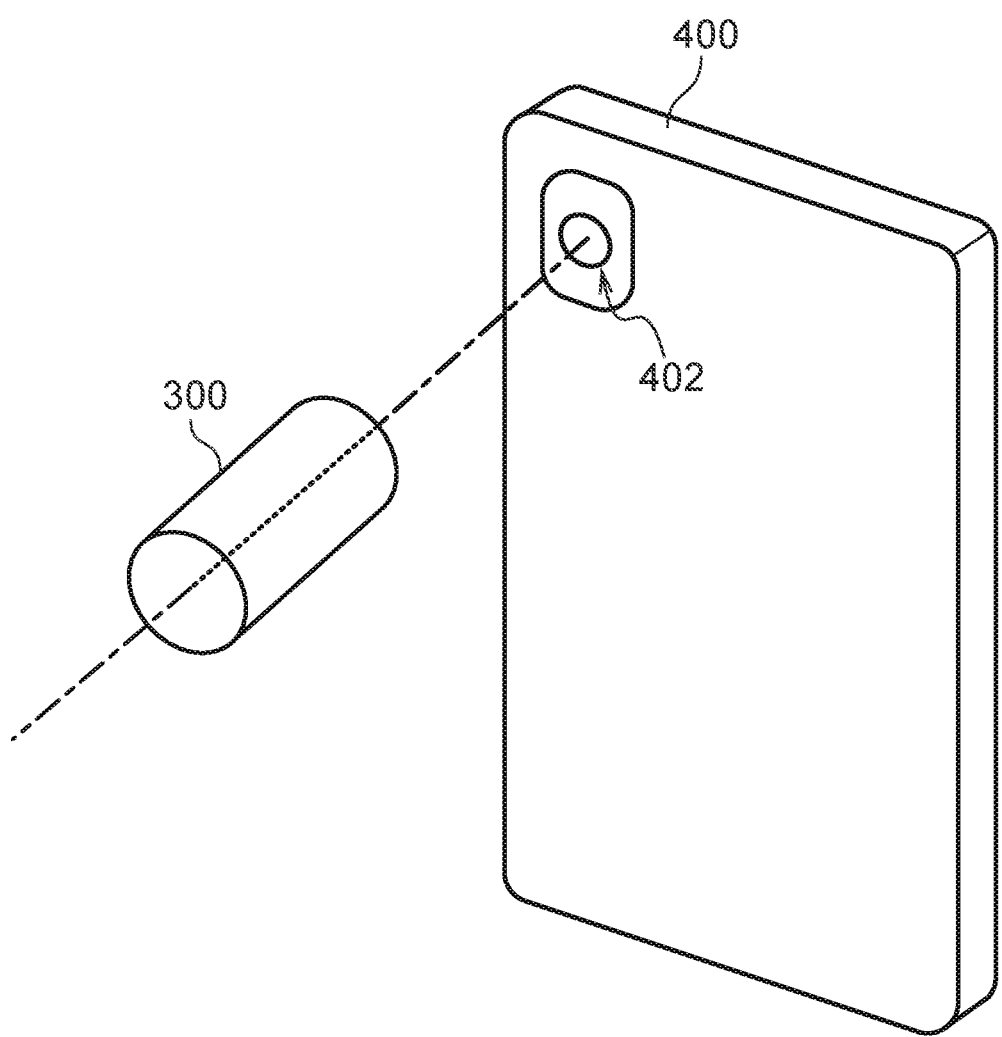
FIG. 12 is a schematic structural drawing illustrating a structure in which an attached optical system relating to a second embodiment can be attached to and removed from a portable terminal.

FIG. 12 illustrates an example of a structure in which an attached optical system 300 relating to the second embodiment can be attached to and removed from a portable terminal 400 that has an imaging function.

As illustrated in FIG. 12, the portable terminal 400 has an imaging section 402 for realizing the imaging function. The imaging section 402 operates in a usual imaging mode, in which the imaging section 402 captures an image of a subject at infinity such as a landscape or the like, by user operation of an unillustrated operation portion that the portable terminal 400 has. Namely, the imaging section 402 of the portable terminal 400 has a lens 404 for a portable terminal (FIG. 13), and is structured so as to, by operation in the usual imaging mode, form an image on an imaging element 406 (FIG. 13) when parallel light is incident.

Figure 13:
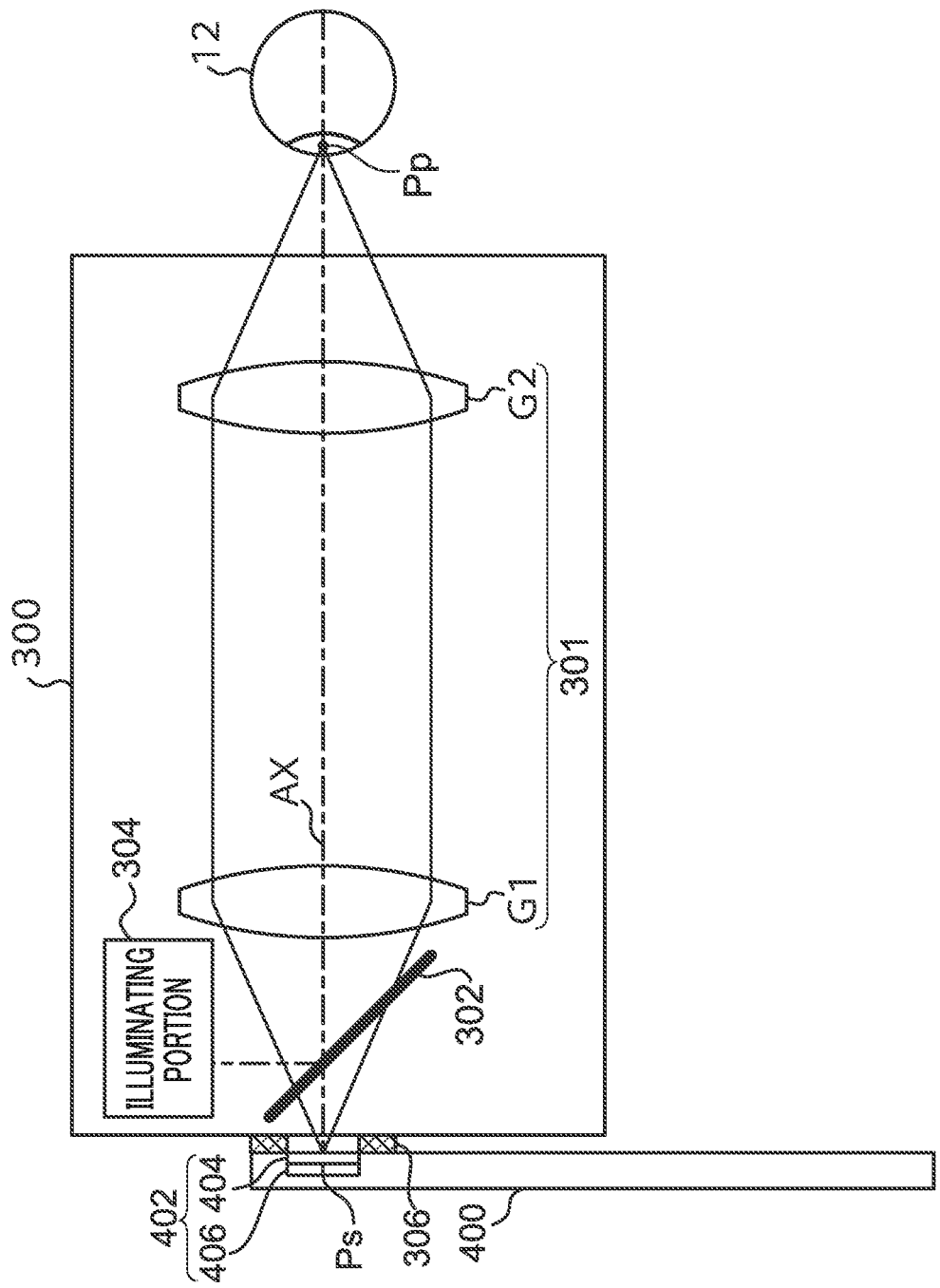
FIG. 13 is a schematic structural drawing illustrating an example of the structure of the attached optical system relating to the second embodiment.

FIG. 13 illustrates an example of the structure of the attached optical system 300 relating to the second embodiment. A state in which the attached optical system 300 is attached to the portable terminal 400 is illustrated in FIG. 13. The attached optical system 300 has the first lens group G1 and the second lens group G2 that structure the above-described objective lens 130. Because the structures of these first lens group G1 and second lens group G2 are similar to the first embodiment, detailed description thereof is omitted.

At the attached optical system 300 relating to the second embodiment, the point that an illuminating portion 304 that emits illumination light, and a half mirror 302 that guides the illumination light that is from the illuminating portion to the optical path that runs along the optical axis AX, are provided at the objective lens 130 relating to the first embodiment, is different. The illuminating portion 304 emits the illumination light that illuminates the subject eye 12. The half mirror 302 guides the illumination light that is from the illuminating portion 304 to the optical path that runs along the optical axis AX.

Note that, in a case in which the portable terminal 400 has a subject illuminating portion that illuminates the subject, it suffices for the attached optical system 300 to, instead of the illuminating portion 304 and the half mirror 302, employ the illumination light that is emitted from the subject illuminating portion, and have an optical system that guides the illumination light that is from the subject illuminating portion to the optical path that runs along the optical axis AX. Further, the illuminating portion 304 may be an independent structure, and not be provided at the attached optical system 300.

The attachment optical system 300 has an attaching portion 306 that attaches the attachment optical system 300 to the portable terminal 400, in order to configure the attachment optical system 300 and the portable terminal 400 attachably and removably. Owing to the attachment optical system 300 having this attaching portion 306, a configuration in which the attachment optical system 300 can be attached to and removed from the portable terminal 400 is enabled.

The first lens group G1 and the second lens group G2 that are included in the attached optical system 300 function as an objective optical system 301 that forms a pupil that has a conjugate relationship with the pupil of the subject eye 12. The attached optical system 300 and the portable terminal 400 are fixed by the attaching portion 306 such that the incident pupil of the imaging section 402 of the portable terminal 400 is positioned at the position (the pupil conjugate position Ps) of the pupil that is in a conjugate relationship with the pupil of the subject eye 12 formed by the objective optical system 301. By structuring the system in this way, a fundus image of the subject eye 12 can be imaged by the simple structure of merely attaching the attached optical system 300 to the portable terminal 400.

Although the technique of the present disclosure has been described by using embodiments, the technical scope of the present disclosure is not limited to the scope put forth in the above-described embodiments. Various modifications and improvements can be added to the above-described embodiments within a scope that does not depart from the gist of the invention, and forms to which such modifications and improvements have been added also are included in the technical scope of the present disclosure. Further, all publications, patent applications, and technical standards mentioned in the present specification are incorporated by reference into the present specification to the same extent as if such individual publication, patent application, or technical standard was specifically and individually indicated to be incorporated by reference.

The invention claimed is:

1. An ophthalmic optical system for observing a subject eye, the system comprising:
an objective optical system that forms a pupil that has a conjugate relationship with a pupil of the subject eye,
wherein, when L represents a distance from a pupil position that has a conjugate relationship with the pupil of the subject eye to the pupil of the subject eye, and D represents a sum of central thicknesses of lenses included in the objective optical system, the following conditional expression is satisfied:

$0.1 < D/L < 0.25;$ wherein, when $\theta s$ represents a field angle from the pupil that has a conjugate relationship with the pupil of the subject eye, and $\theta p$ represents a field angle from the pupil of the subject eye, the following conditional expression is satisfied:

$1.6 < \theta p/\theta s < 4.0;$ 30 degrees $\leq \theta s \leq 45$ degrees.

2. The ophthalmic optical system of claim 1, wherein the objective optical system includes, in order from a side of the pupil position that has a conjugate relationship with the pupil of the subject eye, a first lens group having positive power and a second lens group having positive power.

3. The ophthalmic optical system of claim 2, wherein the objective optical system is an afocal optical system.

4. The ophthalmic optical system of claim 2, wherein, at the first lens group and the second lens group, given that a lens gap where a gap between adjacent lenses is a maximum is a boundary, the first lens group is disposed further toward a side of the pupil position that has a conjugate relationship with the pupil of the subject eye than the boundary, and the second lens group is disposed further toward a side of the subject eye than the boundary.

5. The ophthalmic optical system of claim 2, wherein, when f1 represents a focal distance of the first lens group, and f2 represents a focal distance of the second lens group, the following conditional expression is satisfied:

$0.3 \leq f2/f1 \leq 0.6.$

6. An ophthalmic device, comprising:
a scanning section that scans light from a light source; and
an objective optical system having lens groups that form a pupil, which has a conjugate relationship with a pupil of an subject eye, at the scanning section,
wherein, when L represents a distance from the scanning section to the pupil of the subject eye, and D represents a sum of central thicknesses of the lens groups, the objective optical system satisfies a conditional expression expressed by:

$0.1 < D/L < 0.25$ wherein, when $\theta s$ represents a scanning angle of the scanning section, and $\theta p$ represents an illumination angle onto the pupil of the subject eye by the objective optical system, the following conditional expression is satisfied:

$1.6 \leq \theta p/\theta s \leq 4.0;$ 30 degrees $\leq \theta s \leq 45$ degrees.

7. The ophthalmic device of claim 6, wherein the lens groups include, in order from a side of the scanning section, a first lens group having positive power and a second lens group having positive power.

8. The ophthalmic device of claim 7, wherein the objective optical system is an afocal optical system.

9. The ophthalmic device of claim 7, wherein, at the first lens group and the second lens group, given that a lens gap where a gap between adjacent lenses is a maximum is a boundary, the first lens group is disposed further toward the scanning section side than the boundary, and the second lens group is disposed further toward a side of the subject eye than the boundary.

10. The ophthalmic device of claim 7, wherein, when f1 represents a focal distance of the first lens group, and f2 represents a focal distance of the second lens group, the following conditional expression is satisfied:

$0.3 < f2/f1 < 0.6.$

11. The ophthalmic device of claim 7, wherein, when l2 represents a focal distance of the second lens group, the following condition is satisfied:

$40 \text{ mm} \leq f2 \leq 60 \text{ mm}.$

12. The ophthalmic device of claim 6, wherein, when WD represents a distance from a subject eye-side end portion of the objective optical system to a pupil position of the subject eye, the following condition is satisfied:

$20 \text{ mm} \leq WD \leq 40 \text{ mm}.$

13. The ophthalmic device of claim 6, wherein, when BF represents a distance from a scanning section-side end portion of the objective optical system to a position, which is conjugate with a pupil position of the subject eye, of the scanning section, the following condition is satisfied:

$15 \text{ mm} \leq BF.$

* * * * *